United States Patent
Yatsu et al.

(10) Patent No.: US 10,814,723 B2
(45) Date of Patent: Oct. 27, 2020

(54) PROJECTION OPTICAL SYSTEM, AND HEAD-UP DISPLAY DEVICE

(71) Applicants: MAXELL, LTD., Otokuni-gun, Kyoto (JP); HITACHI INDUSTRY & CONTROL SOLUTIONS, LTD., Hitachi-shi, Ibaraki (JP)

(72) Inventors: Masahiko Yatsu, Otokuni-gun (JP); Koji Hirata, Otokuni-gun (JP); Shigeki Hoshino, Otokuni-gun (JP)

(73) Assignees: MAXELL, LTD., Kyoto (JP); HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 0 days.

(21) Appl. No.: 16/338,223

(22) PCT Filed: Oct. 4, 2016

(86) PCT No.: PCT/JP2016/079488
§ 371 (c)(1),
(2) Date: Mar. 29, 2019

(87) PCT Pub. No.: WO2018/066062
PCT Pub. Date: Apr. 12, 2018

(65) Prior Publication Data
US 2019/0225083 A1    Jul. 25, 2019

(51) Int. Cl.
*B60K 35/00* (2006.01)
*G02B 27/01* (2006.01)
*G03B 21/14* (2006.01)

(52) U.S. Cl.
CPC .......... *B60K 35/00* (2013.01); *G02B 27/0101* (2013.01); *G03B 21/14* (2013.01);
(Continued)

(58) Field of Classification Search
CPC ........ B60K 2370/1529; B60K 2370/23; B60K 2370/334; B60K 35/00; G02B 27/0101; G03B 21/14; G03B 21/28
See application file for complete search history.

(56) References Cited

U.S. PATENT DOCUMENTS

2009/0015735 A1* 1/2009 Simmonds ......... G02B 27/0172
349/11
2011/0075115 A1 3/2011 Ono et al.
(Continued)

FOREIGN PATENT DOCUMENTS

JP    2009-122582 A    6/2009
JP    2009-229552 A    10/2009
(Continued)

OTHER PUBLICATIONS

International Search Report, PCT/JP2016/079488, dated Dec. 27, 2016, 2 pgs.
(Continued)

*Primary Examiner* — Hong Zhou
(74) *Attorney, Agent, or Firm* — Volpe Koenig

(57) ABSTRACT

It is an object of the present invention to provide a projection optical system having a minimal optical configuration while ensuring necessary capabilities and a head-up display device having a tilted virtual image plane. The head-up display device according to the present invention includes an image forming unit to emit image light containing image information and an eyepiece optical system to display a virtual image by reflecting the image light. While a virtual image plane is tilted to display a virtual image in a range from a far distance to a near distance, a point on the image forming unit conjugating to a far point on the virtual image plane is optically farther from a light flux entering the image forming
(Continued)

unit than a point on the image forming unit conjugating to a near point on the virtual image plane.

7 Claims, 33 Drawing Sheets

(52) U.S. Cl.
CPC .. *B60K 2370/1529* (2019.05); *B60K 2370/23* (2019.05); *B60K 2370/334* (2019.05)

(56) References Cited

U.S. PATENT DOCUMENTS

| | | | | |
|---|---|---|---|---|
| 2013/0021224 A1* | 1/2013 | Fujikawa | ........... | G02B 27/0101 345/7 |
| 2013/0100524 A1* | 4/2013 | Magarill | ................ | G02B 17/08 359/365 |
| 2013/0242404 A1* | 9/2013 | Kobayashi | ............ | G02B 27/01 359/630 |
| 2014/0176862 A1* | 6/2014 | Uehara | .................... | G02B 6/06 349/62 |
| 2015/0061976 A1* | 3/2015 | Ferri | ................. | G02B 27/0101 345/9 |
| 2016/0116735 A1* | 4/2016 | Hayashi | ............... | G02B 3/0006 345/7 |
| 2016/0147074 A1* | 5/2016 | Kobayashi | ........... | G02B 3/0068 345/7 |
| 2016/0178902 A1* | 6/2016 | Ando | ........................ | B60R 1/00 348/115 |
| 2016/0195719 A1 | 7/2016 | Yonetani | | |
| 2016/0202482 A1* | 7/2016 | Kuzuhara | .......... | G02B 27/0179 359/633 |
| 2017/0045740 A1 | 2/2017 | Hirata et al. | | |
| 2017/0235138 A1* | 8/2017 | Morohashi | ............. | G03B 21/28 359/631 |

FOREIGN PATENT DOCUMENTS

| | | |
|---|---|---|
| JP | 2011-070087 A | 4/2011 |
| JP | 2011-247997 A | 12/2011 |
| JP | 2012-058294 A | 3/2012 |
| JP | 2015-197496 A | 11/2015 |
| WO | 2015/170406 A1 | 11/2015 |

OTHER PUBLICATIONS

Japanese Office Action dated Jul. 28, 2020 for Japanese Patent Application No. 2018-543509.

* cited by examiner

FIG. 4

| NOMINAL | SURFACE NO. | SHAPE | CURVATURE RADIUS | INTERPLANAR DISTANCE | GLASS MATERIAL NAME | CONTENT OF DECENTERING TILTING | DECENTERING (mm) | | | TILTING (DEGREE) | | |
|---|---|---|---|---|---|---|---|---|---|---|---|---|
| | | | | | | | X-AXIS | Y-AXIS | Z-AXIS | AROUND X-AXIS | AROUND Y-AXIS | AROUND Z-AXIS |
| VIRTUAL IMAGE PLANE | 0 | FLAT SURFACE | ∞ | 16500 | | DECENTER & RETURN | 0 | 0 | 0 | 80 | 0 | 0 |
| ENTRANCE PUPIL | 1 | FLAT SURFACE | ∞ | -680 | | | 0 | 0 | 0 | -0.7 | 0 | 0 |
| WINDSHIELD | 2 | ANAMORPHIC ASPHERICAL SURFACE | 9686 / 5531 | 0 | REFLECTIVE | DECENTER & RETURN | -340 | -1959 | -2665 | -43.7 | 0 | 0 |
| DUMMY SURFACE | 3 | FLAT SURFACE | ∞ | 353.624 | | NORMAL DECENTERING | 0 | 0 | 0 | -130.759 | -6.846 | 0 |
| MIRROR | 4 | FREE CURVED SURFACE | -710.957 | 0 | REFLECTIVE | DECENTER & RETURN | 0 | 0 | 0 | -31.016 | -12.423 | -40.712 |
| DUMMY SURFACE | 5 | FLAT SURFACE | ∞ | -217.078 | | NORMAL DECENTERING | 0 | 0 | 0 | -30.157 | -8.520 | 0 |
| MIRROR | 6 | FLAT SURFACE | ∞ | 0 | REFLECTIVE | DECENTER & RETURN | 0 | 0 | 0 | 30.289 | 2.361 | 0 |
| DUMMY SURFACE | 7 | FLAT SURFACE | ∞ | 107.745 | | NORMAL DECENTERING | 0 | 0 | 0 | 84.326 | 2.803 | 0 |
| L1 | 8 | FREE CURVED SURFACE | ∞ | 2.000 | PMMA25 | NORMAL DECENTERING | 5.091 | -7.494 | 0 | 2.466 | -14.293 | 0.041 |
| | 9 | FREE CURVED SURFACE | ∞ | 33.938 | | NORMAL DECENTERING | 5.333 | -36.214 | 0 | 0 | 0 | 0 |
| L2 | 10 | SPHERICAL SURFACE | -114.988 | 4.700 | SLAM66 | NORMAL DECENTERING | 0.499 | -38.333 | 0 | -36.966 | -1.711 | 13.451 |
| | 11 | FLAT SURFACE | ∞ | 1.240 | | | 0 | 0 | 0 | 0 | 0 | 0 |
| POLARIZATION PLATE BASE MATERIAL | 12 | FLAT SURFACE | ∞ | 0.122 | 50.30 | | 0 | 0 | 0 | 0 | 0 | 0 |
| | 13 | FLAT SURFACE | ∞ | 0.600 | 52.60 | | 0 | 0 | 0 | 0 | 0 | 0 |
| | 14 | FLAT SURFACE | ∞ | 0.000 | | | 0 | 0 | 0 | 0 | 0 | 0 |
| INTERMEDIATE IMAGE | 15 | FLAT SURFACE | ∞ | 0.000 | | | 0 | 0 | 0 | 0 | 0 | 0 |

FIG. 5

| CODE | | MIRROR SURFACE (4TH) | L1A SURFACE (8TH) | L1B SURFACE (9TH) |
|---|---|---|---|---|
| R | $1/c$ | −710.957 | ∞ | ∞ |
| K | K | −1.84494 | | |
| C2 | $X$ | 4.47944E−01 | 9.96573E−02 | |
| C3 | $Y$ | −8.11952E−02 | −1.45254E−01 | |
| C4 | $X^2$ | −8.60696E−05 | −2.40241E−03 | −3.05521E−03 |
| C5 | $XY$ | −1.31216E−04 | 4.40825E−03 | −8.61075E−03 |
| C6 | $Y^2$ | 3.17340E−05 | −2.93085E−02 | −4.74723E−03 |
| C7 | $X^3$ | 7.44638E−07 | −6.79589E−05 | 2.74246E−05 |
| C8 | $X^2Y$ | 6.50020E−08 | 1.44061E−04 | −2.42243E−05 |
| C9 | $XY^2$ | 5.08521E−07 | 2.70281E−04 | −2.54718E−04 |
| C10 | $Y^3$ | −9.15680E−08 | −1.20861E−04 | 8.10810E−05 |
| C11 | $X^4$ | −7.81224E−10 | 1.52039E−06 | −7.73734E−07 |
| C12 | $X^3Y$ | 9.69936E−10 | 1.03065E−06 | 2.55001E−06 |
| C13 | $X^2Y^2$ | −1.64539E−09 | 4.64614E−06 | −5.14882E−06 |
| C14 | $XY^3$ | 9.02586E−10 | 5.48504E−06 | −4.65230E−06 |
| C15 | $Y^4$ | −8.28544E−10 | 8.34279E−06 | 2.40885E−08 |
| C16 | $X^5$ | 2.64296E−12 | −5.05676E−09 | 1.19082E−08 |
| C17 | $X^4Y$ | 1.23069E−11 | 2.30730E−08 | −4.10172E−08 |
| C18 | $X^3Y^2$ | −8.01710E−12 | 1.47599E−07 | −6.83534E−08 |
| C19 | $X^2Y^3$ | 6.56651E−12 | 1.80655E−08 | −1.31103E−07 |
| C20 | $XY^4$ | 9.55142E−13 | −1.87749E−08 | −4.45397E−08 |
| C21 | $Y^5$ | 8.54085E−13 | 2.85229E−08 | −4.93600E−08 |
| C22 | $X^6$ | 4.96247E−14 | 1.66159E−10 | 1.98402E−10 |
| C23 | $X^5Y$ | −4.98916E−14 | 8.32609E−11 | 1.55862E−09 |
| C24 | $X^4Y^2$ | 1.53392E−13 | −9.44058E−11 | 6.91783E−10 |
| C25 | $X^3Y^3$ | −1.49259E−13 | 2.41445E−09 | −7.34931E−09 |
| C26 | $X^2Y^4$ | 2.47485E−13 | −5.05905E−10 | −3.85824E−10 |
| C27 | $XY^5$ | −1.50298E−13 | −7.50455E−10 | 9.86404E−10 |
| C28 | $Y^6$ | 8.62937E−14 | −1.04570E−09 | 9.50594E−10 |
| C29 | $X^7$ | 2.38876E−16 | 8.31872E−13 | 3.37804E−13 |
| C30 | $X^6Y$ | −7.52622E−17 | 8.55385E−12 | −1.25351E−12 |
| C31 | $X^5Y^2$ | 6.05135E−16 | 7.93082E−12 | 4.82934E−11 |
| C32 | $X^4Y^3$ | 6.11933E−16 | −5.61220E−12 | 4.96131E−11 |
| C33 | $X^3Y^4$ | −2.28585E−16 | −1.41337E−11 | −1.71038E−10 |
| C34 | $X^2Y^5$ | 8.60953E−16 | 2.17831E−12 | 1.67774E−11 |
| C35 | $XY^6$ | −1.35525E−16 | 1.09376E−11 | 3.33417E−11 |
| C36 | $Y^7$ | 1.90255E−17 | 3.07852E−11 | 4.07027E−11 |
| C37 | $X^8$ | 1.92381E−19 | −1.54917E−14 | −2.65672E−14 |
| C38 | $X^7Y$ | 2.84856E−18 | 6.15593E−14 | −1.21546E−14 |
| C39 | $X^6Y^2$ | −1.11954E−18 | 3.01932E−13 | −7.62260E−14 |
| C40 | $X^5Y^3$ | 1.49781E−18 | 1.01833E−13 | 3.57990E−13 |
| C41 | $X^4Y^4$ | 6.04207E−18 | −3.05356E−13 | 4.79601E−13 |
| C42 | $X^3Y^5$ | −2.99940E−19 | −6.65397E−13 | −1.25943E−12 |
| C43 | $X^2Y^6$ | −4.50379E−19 | 3.25713E−13 | 1.44938E−13 |
| C44 | $XY^7$ | 9.74405E−19 | 2.71427E−13 | 2.62116E−13 |
| C45 | $Y^8$ | −2.23786E−18 | 7.54889E−13 | 2.87968E−13 |
| C46 | $X^9$ | 2.07731E−21 | 5.21635E−17 | |
| C47 | $X^8Y$ | −5.58768E−21 | −9.71550E−17 | |
| C48 | $X^7Y^2$ | 1.52929E−20 | 1.25980E−15 | |
| C49 | $X^6Y^3$ | 8.58719E−22 | 4.03298E−15 | |
| C50 | $X^5Y^4$ | −1.64242E−20 | 7.85770E−16 | |
| C51 | $X^4Y^5$ | 1.02916E−20 | −3.69627E−15 | |
| C52 | $X^3Y^6$ | 1.69557E−20 | −4.30406E−15 | |
| C53 | $X^2Y^7$ | −4.64402E−21 | 2.99505E−15 | |
| C54 | $XY^8$ | −2.03005E−20 | 1.31212E−15 | |
| C55 | $Y^9$ | 2.70007E−21 | 3.88477E−15 | |

FIG.12

| NOMINAL | SURFACE NO. | SHAPE | CURVATURE RADIUS | INTERPLANAR DISTANCE | GLASS MATERIAL NAME | CONTENT OF DECENTERING/TILTING | DECENTERING (mm) | | | TILTING (DEGREE) | | |
|---|---|---|---|---|---|---|---|---|---|---|---|---|
| | | | | | | | X-AXIS | Y-AXIS | Z-AXIS | AROUND X-AXIS | AROUND Y-AXIS | AROUND Z-AXIS |
| VIRTUAL IMAGE PLANE | 0 | FLAT SURFACE | ∞ | 16500 | | DECENTER & RETURN | 0 | 0 | 0 | 84 | 0 | 0 |
| ENTRANCE PUPIL | 1 | FLAT SURFACE | ∞ | -680 | | | 0 | 0 | 0 | -0.7 | 0 | 0 |
| WINDSHIELD | 2 | ANAMORPHIC ASPHERICAL SURFACE | 9686 / 5531 | 0 | REFLECTIVE | DECENTER & RETURN | -340 | -1959 | -2665 | -43.7 | -4.131 | 0 |
| DUMMY SURFACE | 3 | FLAT SURFACE | ∞ | 350.336 | | NORMAL DECENTERING | 0 | 0 | 0 | -132.41 | -13.938 | -41.065 |
| MIRROR | 4 | FREE CURVED SURFACE | -729.884 | 0 | REFLECTIVE | DECENTER & RETURN | 0 | 0 | 0 | -30.592 | -9.673 | 0 |
| DUMMY SURFACE | 5 | FLAT SURFACE | ∞ | -215.079 | | NORMAL DECENTERING | 0 | 0 | 0 | -31.494 | 5.932 | 0 |
| MIRROR | 6 | FLAT SURFACE | ∞ | 0 | REFLECTIVE | DECENTER & RETURN | 0 | 0 | 0 | 30.245 | 1.921 | 0 |
| DUMMY SURFACE | 7 | FLAT SURFACE | ∞ | 106.229 | | NORMAL DECENTERING | 0 | 0 | 0 | 85.419 | -3.471 | -8.054 |
| L1 | 8 | FREE CURVED SURFACE | ∞ | 2.000 | PMMA25 | NORMAL DECENTERING | 3.065 | -12.686 | 0 | 5.849 | 0 | 0 |
| | 9 | FREE CURVED SURFACE | ∞ | 48.145 | | | 0 | 0 | 0 | 0 | 0 | 0 |
| L2 | 10 | SPHERICAL SURFACE | -138.552 | 5.150 | SLAM66 | NORMAL DECENTERING | 7.440 | -34.865 | 0 | -47.488 | -7.100 | 9.514 |
| | 11 | FLAT SURFACE | ∞ | 1.240 | | | 0 | 0 | 0 | 0 | 0 | 0 |
| POLARIZATION PLATE BASE MATERIAL | 12 | FLAT SURFACE | ∞ | 0.122 | 50.30 | NORMAL DECENTERING | 1.332 | -56.225 | 0 | 0 | 0 | 0 |
| | 13 | FLAT SURFACE | ∞ | 0.600 | 52.60 | | 0 | 0 | 0 | 0 | 0 | 0 |
| | 14 | FLAT SURFACE | ∞ | 0.000 | | | 0 | 0 | 0 | 0 | 0 | 0 |
| INTERMEDIATE IMAGE | 15 | FLAT SURFACE | ∞ | 0.000 | | | 0 | 0 | 0 | 0 | 0 | 0 |

FIG.13

| CODE | | MIRROR SURFACE (4TH) | L1A SURFACE (8TH) | L1B SURFACE (9TH) |
|---|---|---|---|---|
| R | $1/c$ | −729.884 | ∞ | ∞ |
| K | K | −2.49374 | | |
| C2 | $X$ | 4.49774E−01 | 1.80869E−01 | |
| C3 | $Y$ | −8.47634E−02 | −9.42017E−02 | |
| C4 | $X^2$ | −8.21310E−05 | −1.25045E−03 | −1.47216E−03 |
| C5 | $XY$ | −1.36634E−04 | 1.18154E−02 | −6.94017E−03 |
| C6 | $Y^2$ | 2.55589E−05 | −3.12845E−02 | −1.20645E−02 |
| C7 | $X^3$ | 7.41054E−07 | −8.32824E−05 | −7.56158E−06 |
| C8 | $X^2Y$ | 5.00099E−08 | 1.66438E−04 | 3.01862E−05 |
| C9 | $XY^2$ | 4.53872E−07 | 3.03087E−04 | −2.60695E−04 |
| C10 | $Y^3$ | −9.17308E−08 | −1.21598E−04 | −6.87872E−05 |
| C11 | $X^4$ | −7.75685E−10 | 1.84637E−06 | −4.65952E−07 |
| C12 | $X^3Y$ | 2.02650E−10 | 1.11032E−06 | 1.37307E−06 |
| C13 | $X^2Y^2$ | −1.25829E−09 | 4.73878E−06 | −5.17059E−06 |
| C14 | $XY^3$ | −1.28724E−10 | 4.40578E−06 | −4.12363E−06 |
| C15 | $Y^4$ | −7.19187E−10 | 8.88669E−06 | −9.21517E−07 |
| C16 | $X^5$ | 9.21318E−12 | −9.78794E−09 | 8.62008E−09 |
| C17 | $X^4Y$ | −1.97543E−11 | 1.80392E−08 | −5.41218E−08 |
| C18 | $X^3Y^2$ | 3.21512E−11 | 1.67625E−07 | −1.00702E−07 |
| C19 | $X^2Y^3$ | −3.25599E−11 | 1.77441E−08 | −1.74265E−07 |
| C20 | $XY^4$ | 1.88869E−11 | −2.07249E−08 | −4.37374E−08 |
| C21 | $Y^5$ | −5.53358E−12 | 3.10821E−08 | −4.61573E−08 |
| C22 | $X^6$ | 7.11579E−14 | 2.14079E−10 | 1.12029E−10 |
| C23 | $X^5Y$ | −2.74761E−13 | −3.01569E−11 | 1.53563E−09 |
| C24 | $X^4Y^2$ | 4.47118E−13 | −1.22243E−10 | 3.21194E−10 |
| C25 | $X^3Y^3$ | −3.90370E−13 | 2.65041E−09 | −7.67494E−09 |
| C26 | $X^2Y^4$ | 2.67234E−13 | −5.55894E−10 | −6.87552E−10 |
| C27 | $XY^5$ | −1.48285E−13 | −5.78716E−10 | 9.72602E−10 |
| C28 | $Y^6$ | 6.80022E−14 | −1.06529E−09 | 1.05549E−09 |
| C29 | $X^7$ | −1.48048E−16 | 8.80919E−13 | 6.19293E−13 |
| C30 | $X^6Y$ | 4.19410E−16 | 9.79541E−12 | −3.51323E−12 |
| C31 | $X^5Y^2$ | 5.26208E−18 | 6.64117E−12 | 4.44285E−11 |
| C32 | $X^4Y^3$ | 1.17419E−15 | −7.05891E−12 | 4.71152E−11 |
| C33 | $X^3Y^4$ | −1.58698E−15 | −1.60945E−11 | −1.65757E−10 |
| C34 | $X^2Y^5$ | 8.19695E−16 | 3.47112E−12 | 3.28183E−11 |
| C35 | $XY^6$ | 2.47882E−16 | 1.13822E−11 | 4.00875E−11 |
| C36 | $Y^7$ | −1.00755E−16 | 3.10870E−11 | 4.19718E−11 |
| C37 | $X^8$ | −2.73320E−18 | −7.69006E−15 | −2.00769E−14 |
| C38 | $X^7Y$ | 8.96866E−18 | 7.77994E−14 | −4.52132E−15 |
| C39 | $X^6Y^2$ | 1.43182E−18 | 2.50537E−13 | −1.09423E−13 |
| C40 | $X^5Y^3$ | 6.10134E−18 | 9.13178E−14 | 2.71730E−13 |
| C41 | $X^4Y^4$ | −4.57049E−18 | −2.47436E−13 | 5.36521E−13 |
| C42 | $X^3Y^5$ | 5.01544E−19 | −6.75179E−13 | −1.13030E−12 |
| C43 | $X^2Y^6$ | 5.68359E−18 | 3.66512E−13 | 3.16518E−13 |
| C44 | $XY^7$ | −2.63706E−18 | 2.38652E−13 | 3.38791E−13 |
| C45 | $Y^8$ | −5.39654E−19 | 7.51345E−13 | 2.81482E−13 |
| C46 | $X^9$ | −5.06720E−21 | 1.22096E−18 | |
| C47 | $X^8Y$ | −3.35839E−22 | −1.28163E−16 | |
| C48 | $X^7Y^2$ | 8.59152E−20 | 1.34818E−15 | |
| C49 | $X^6Y^3$ | −1.10698E−19 | 2.79677E−15 | |
| C50 | $X^5Y^4$ | 4.37804E−20 | 3.91690E−16 | |
| C51 | $X^4Y^5$ | 5.19169E−20 | −2.82439E−15 | |
| C52 | $X^3Y^6$ | −3.94588E−20 | −4.26223E−15 | |
| C53 | $X^2Y^7$ | 5.64009E−21 | 3.12438E−15 | |
| C54 | $XY^8$ | −1.35579E−20 | 1.12342E−15 | |
| C55 | $Y^9$ | 5.46570E−21 | 3.80847E−15 | |
| C56 | $X^{10}$ | | | |
| C57 | $X^9Y$ | | | |
| C58 | $X^8Y^2$ | | | |
| C59 | $X^7Y^3$ | | | |
| C60 | $X^6Y^4$ | | | |
| C61 | $X^5Y^5$ | | | |
| C62 | $X^4Y^6$ | | | |
| C63 | $X^3Y^7$ | | | |
| C64 | $X^2Y^8$ | | | |
| C65 | $XY^9$ | | | |
| C66 | $Y^{10}$ | | | |

PROJECTION OPTICAL SYSTEM, AND HEAD-UP DISPLAY DEVICE

TECHNICAL FIELD

The present invention relates to a projection optical system and a head-up display device.

BACKGROUND ART

There is known a head-up display device that projects images on a windscreen (windshield) provided for mobile objects such as vehicles and airplanes and enables a projected image to be observed as a virtual image across the windshield.

For example, patent literature 1 discloses the device as a conventional head-up display device "including a projection optical system that irradiates the light from behind a transmissive liquid crystal display panel and enlarges and projects an image displayed on the liquid crystal display panel (excerpted from the abstract)."

Patent literature 2 discloses "the display device that includes a first mirror and a second mirror in order along an optical path from the display device to an observer and satisfies conditional expressions (to display a virtual image guided to an observing point region of the observer) such as $\theta x > \theta y$, where $\theta x$ denotes an incident angle on the first mirror in the direction of the long axis of an image and $\theta y$ denotes an incident angle on the first mirror in the direction of the short axis of an image, and $0.2 < D1/Lh < 0.9$, where D1 denotes a distance between the surface of the display device to display images and the first mirror (optical path length at the center of an observing point region) and Lh denotes the horizontal width of a virtual image viewed by the observer (excerpted from the abstract)."

Patent literature 3 discloses "the virtual image display device that projects a video output from a projector 4 to a screen 5, reflects the video projected to the screen 5 on a front window 6 of a vehicle 2, allows an occupant 7 of the vehicle to view the video, and generates a virtual image 8 of the video viewed by the occupant 7 of the vehicle. A movable screen 5 makes it possible to vary an angle of the screen 5 against an optical path of the projector 4 and controls the radiation direction to radiate a laser beam from the projector 4 to the screen 5 based on the angle of the screen 5 against the optical path of the projector 4 (excerpted from the abstract)." Namely, as an example of conventional head-up display devices, patent literature 3 discloses the configuration that tilts a virtual image plane by placing the screen so as to tilt against an optical path of the projector.

CITATION LIST

Patent Literature

PATENT LITERATURE 1: JP-A No. 2009-229552
PATENT LITERATURE 2: US Patent Application Publication No. 2016/195719
PATENT LITERATURE 3: JP-A No. 2015-197496

SUMMARY OF INVENTION

Technical Problem

The example of the head-up display device disclosed in patent literature 2 provides a thin head-up display device by horizontally repositioning the display device and the first mirror (rotationally asymmetric mirror). However, the first working example of patent literature 2 uses a horizontally long virtual image sized as 140 by 70 mm. A light flux is curved in a horizontal direction that ensures a light flux size twice as large as the vertical size. Therefore, the curved mirror is large sized. Even the thin head-up display device makes it difficult to reduce a cubic capacity of the head-up display device.

The example of the head-up display device disclosed in patent literature 3 describes the relationship between the tilt direction of the virtual image plane and the tilt direction of the screen. This relationship can be ascertained in the "Scheimpflug principle." Based on the Scheimpflug principle, the head-up display device according to patent literature 3 needs to display a trapezoidal video on the screen or the liquid crystal display. As a result, the number of effective pixels decreases, thus reducing the amount of displayable information.

The present invention has been made in consideration of the foregoing. It is an object of the invention to provide a projection optical system having a minimal optical configuration while ensuring necessary capabilities and a head-up display device having a tilted virtual image plane.

Solution to Problem

In order to solve the above-described issue, a projection optical system includes an eyepiece optical system that generates image information and displays a virtual image by reflecting image light emitted from an image forming unit to emit the image light including the image information. The eyepiece optical system includes a free curved surface lens and a free curved surface concave mirror in order from the image forming unit side along an emission direction of the image light. When a virtual image plane is tilted to display a virtual image in a range from a far distance to a near distance, a point on the image forming unit conjugating to a far point on the virtual image plane is optically farther from a light flux entering the image forming unit than a point on the image forming unit conjugating to a near point on the virtual image plane.

Advantageous Effects of Invention

The present invention can provide a projection optical system having a minimal optical configuration while ensuring necessary capabilities and a head-up display device having a tilted virtual image plane. Description of the embodiments below will clarify issues, configuration, and effects other than those mentioned above.

BRIEF DESCRIPTION OF DRAWINGS

FIG. 4 is a diagram illustrating lens data of the head-up display device according to the first embodiment.

FIG. 5 is a diagram illustrating free curved surface coefficients for the head-up display device according to the first embodiment.

FIG. 12 is a diagram illustrating lens data of the head-up display device according to the second embodiment.

FIG. 13 is a diagram illustrating free curved surface coefficients for the head-up display device according to the second embodiment.

DESCRIPTION OF EMBODIMENTS

The description below explains embodiments and various working examples of the present invention with reference to the accompanying drawings. The following description provides specific examples of the contents of the present invention. The present invention is not limited to the description thereof and is capable of various modifications and corrections by those skilled in the art within the scope of the technical idea disclosed in the present specification. Throughout all drawings illustrating the present invention, members having the same function are given the same reference symbol and a repetitive description may be omitted. The description below explains the common subject matters of all the embodiments and subsequently features of each embodiment.

Figure 22:
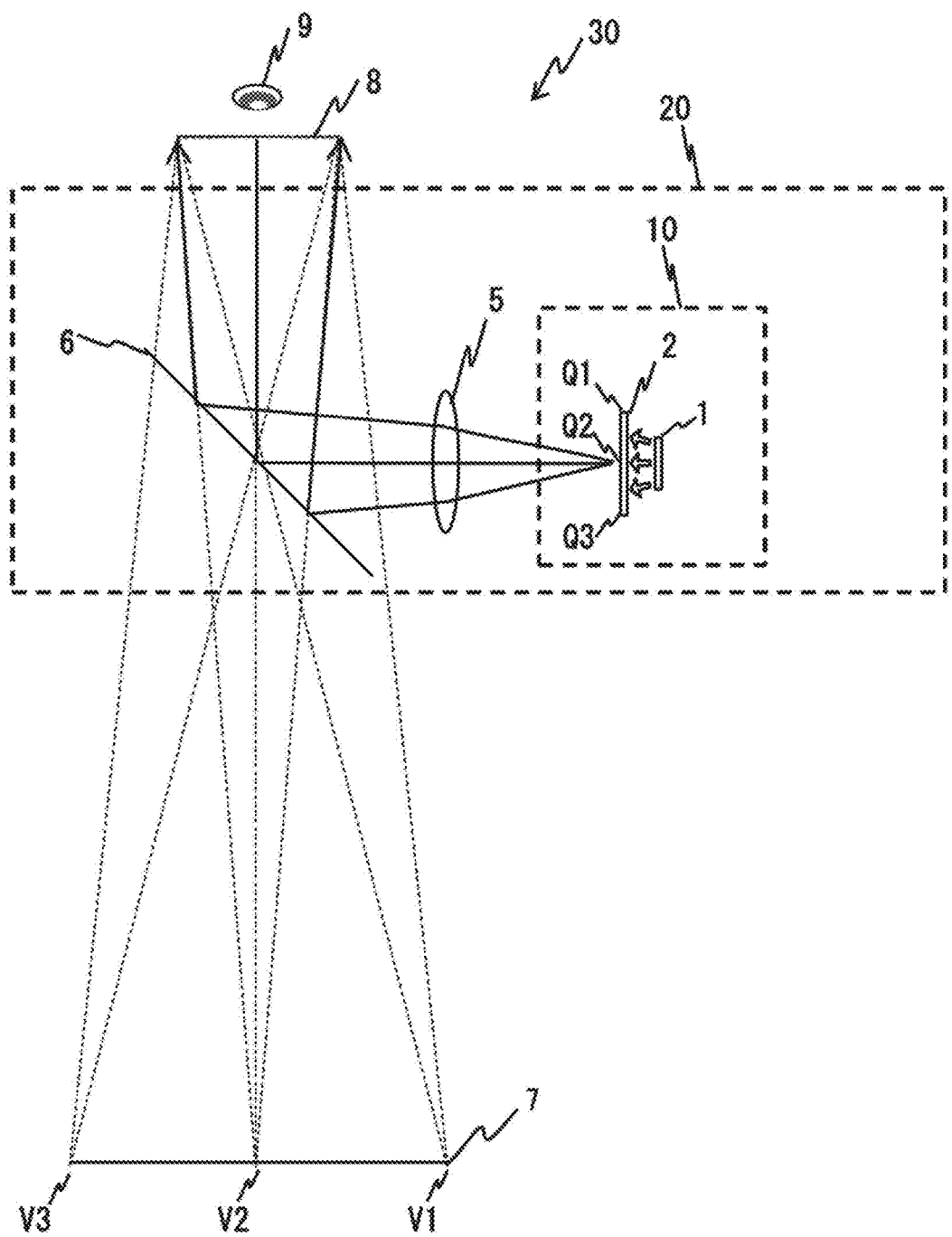
FIG. 22 is a schematic configuration diagram illustrating the head-up display device.

A basic configuration of a head-up display device 30 will be described with reference to FIG. 22. FIG. 22 is a schematic configuration diagram illustrating the head-up display device 30.

The head-up display device 30 illustrated in FIG. 22 provides a projection optical system 20 that includes an image forming unit 10 and an eyepiece optical system 5. The head-up display device 30 is given a configuration that allows the projection optical system 20 to radiate image light, reflects the image light on a windshield 6 of an automobile (unshown), and allows the image light to enter an eye 9 of an observer. This configuration causes the eye 9 of the observer to virtually view image information over a virtual image plane 7.

Figure 25:
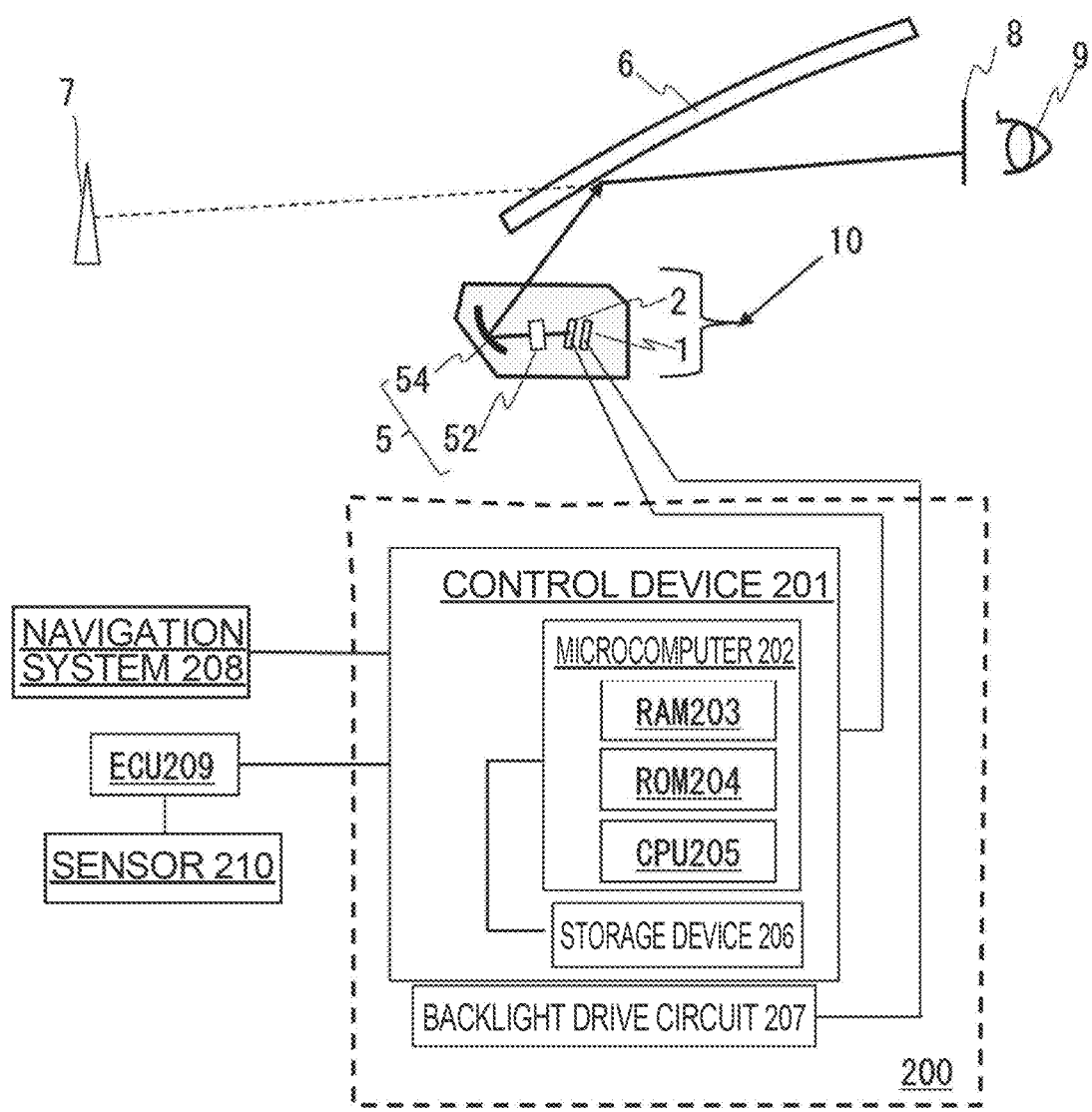
FIG. 25 is a function block diagram of the image forming unit.

The image forming unit 10 will be first described with reference to FIG. 25. FIG. 25 is a function block diagram of the image forming unit. As illustrated in FIG. 25, the image forming unit 10 includes a liquid crystal display panel 2, a backlight 1, and a controller 200 to control operation of these. The image forming unit 10 radiates the light from the backlight 1 to the liquid crystal display panel 2 and outputs picture information (image information) displayed on the liquid crystal display panel 2 to the eyepiece optical system 5.

The controller 200 includes a control device 201. The control device 201 is supplied with various information from an external device. The external device is connected to the control device 201 and is available as a navigation system 208 or an ECU (Electronic Control Unit) 209, for example. The navigation system 208 is provided as a navigation device and generates and outputs information about the operation of a mobile object mounted with the head-up display device 30. The ECU 209 controls the operation of the mobile object. Various types of sensor 210 provided for the mobile object are connected to the ECU 209 and notify detected information to the ECU 209.

The controller 200 includes the control device 201 and a backlight drive circuit 207. The control device 201 processes various data from the external device described above. The backlight drive circuit 207 drives the backlight 1.

The control device 201 includes a microcomputer 202 and a storage device 206 connected to the microcomputer 202.

The microcomputer 202 includes a RAM (Random Access Memory) 203, a CPU (Central Processing Unit) 205, and a ROM (Read Only Memory) 204. The RAM 203 stores various data from the external device. The CPU 205 performs arithmetic processing that generates image data as a source of a virtual image viewed by an observer. The ROM 204 stores programs or parameters capable of performing arithmetic processing in the CPU 205.

The controller 200 configured as above displays image information on the liquid crystal display panel 2 included in the image forming unit 10. The image forming unit 10 outputs the image information displayed on the liquid crystal display panel 2 as an image light flux based on a light flux radiated from the backlight 1.

Return to FIG. 22. The eyepiece optical system 5 projects the image light flux output from the image forming unit 10 onto the windshield 6. The image light flux projected on the windshield 6 reflects off the windshield 6 and reaches the position of the eye 9 of the observer. This constitutes the relationship as if the eye 9 of the observer were viewing the image information on the virtual image plane 7.

As illustrated in FIG. 22, suppose virtual points Q1, Q2, and Q3 on the surface of the liquid crystal display panel 2 where image light fluxes are output. The image light fluxes are output from these virtual points and correspond to virtual points V1, V2, and V3 on the virtual image plane 7 as illustrated in FIG. 22. An eye box 8 provides a range that makes it possible to view the points V1, V2, and V3 on the virtual image plane 7 even if the eye 9 of the observer is repositioned.

FIG. 22 provides a side view of the head-up display device 30. However, the actual head-up display device 30 is three-dimensionally configured. The eye box 8 is therefore two-dimensionally wide. The eyepiece optical system 5 is similar to an eyepiece lens used for a camera finder or a microscope and displays an image (virtual image) of an object (space image) in front of the observer.

Figure 26:
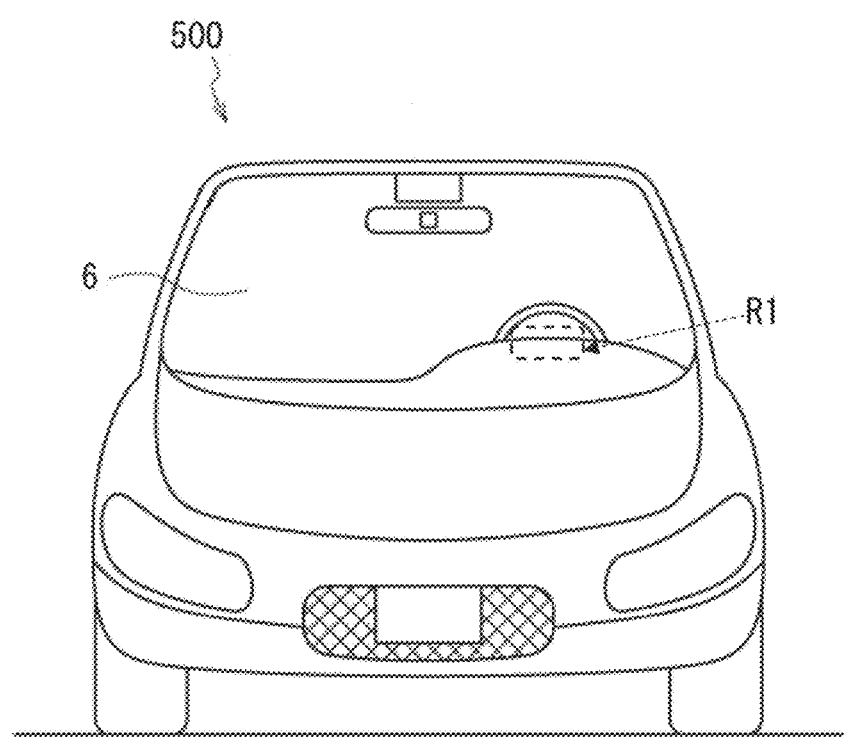
FIG. 26 is a plan view of an automobile as a mobile object viewed from the front.

With reference to FIG. 26, the description below explains an example of mounting the head-up display device 30 on a mobile object. FIG. 26 is a plan view of an automobile 500 as a mobile object viewed from the front. The automobile 500 as illustrated in FIG. 26 is provided with the windshield 6 as a windscreen at the front ahead of the driver's seat.

The head-up display device 30 projects an image light flux to the windshield 6 and thereby enables an observer at the driver's seat to view various information about operations of the automobile 500 as a virtual image. The image light flux is projected ahead of the driver's seat or its vicinity. For example, the image light flux is projected to a position such as a rectangular region R1 represented by a broken line.

Principle Applicable to the Present Invention

With reference to FIGS. 17 through 20, the description below explains conditions to tilt the virtual image plane 7 in the head-up display device 30.

Figure 17A:
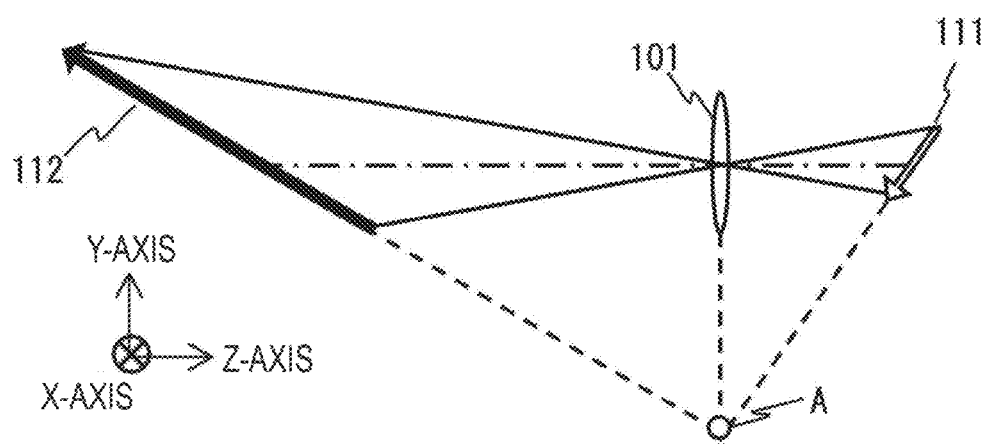
FIG. 17A is an explanatory diagram illustrating the Scheimpflug principle in a real image optical system.

The description below first explains the "Scheimpflug principle" applicable to the head-up display device 30 according to the present embodiment. As illustrated in FIG. 17A, an object surface 111 is obliquely placed against a convex lens 101. Then, a real image surface 112 is formed obliquely. According to the Scheimpflug principle, an extended line for a principal plane of the convex lens 101, an extended line for the object surface 111, and an extended line for the real image surface 112 intersect with each other at one point (point A in the drawing). FIG. 17A illustrates image formation of a real image optical system. Therefore, the object surface 111 and the real image surface 112 reverse up-down and right-left. FIG. 17A illustrates that the orientation (white arrow) of the object surface 111 and the orientation (black arrow) of the real image surface 112 reverse up-down.

Figure 17B:
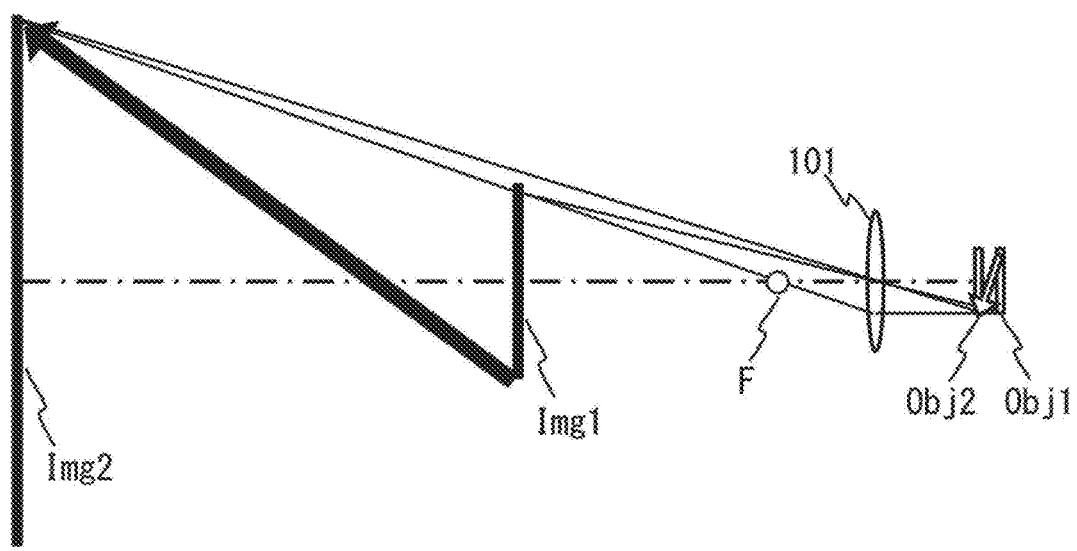
FIG. 17B is an explanatory diagram illustrating a tilted object in the real image optical system.

FIG. 17B uses drawing to find a position of image surface Img in relation to object Obj based on an intersection point between rays on condition that one ray parallel to the optical axis of the convex lens 101 focuses on focus position F of the convex lens 101 and another ray straight travels the center of the convex lens 101. Suppose image position Img1 represents the position of an image corresponding to object position Obj1 as the position of object Obj. The gradient of the ray passing through the center of the convex lens 101 increases when object Obj is moved from object position Obj1 to object position Obj2 to approach the convex lens 101. The image thereby moves from image position Img1 to image position Img2. Namely, the image position gets away from the convex lens 101. As illustrated in FIG. 17B, part of object Obj is fixed to object position Obj1 and the other part thereof is moved to object position Obj2 to tilt object Obj. In this case, an image is formed to tilt from image position Img1 to image position Img2.

Figure 18A:
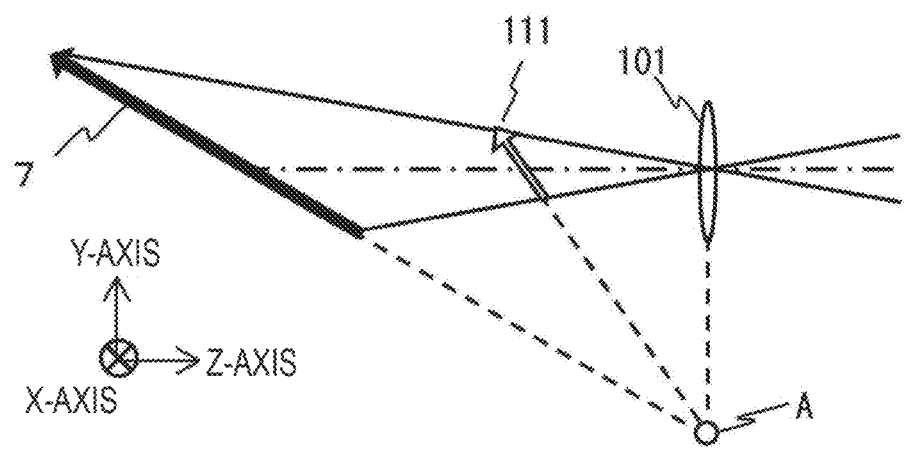
FIG. 18A is an explanatory diagram illustrating the Scheimpflug principle in a virtual image optical system.

There has been described the image formation of a real image with reference to FIGS. 17A and 17B. The description below explains the image formation of a virtual image based on the Scheimpflug principle with reference to FIGS. 18A and 18B. FIG. 18A illustrates intersection among an extended line for the principal plane of the convex lens 101, an extended line for the object surface 111, and an extended line for a virtual image plane 7 at one point (point A in FIG. 18A).

Unlike the real image optical system, the virtual image optical system allows the object surface 111 and the real image surface 112 to maintain the same orientation as illustrated in FIG. 18A, without up-down or right-left reversal.

Figure 18B:
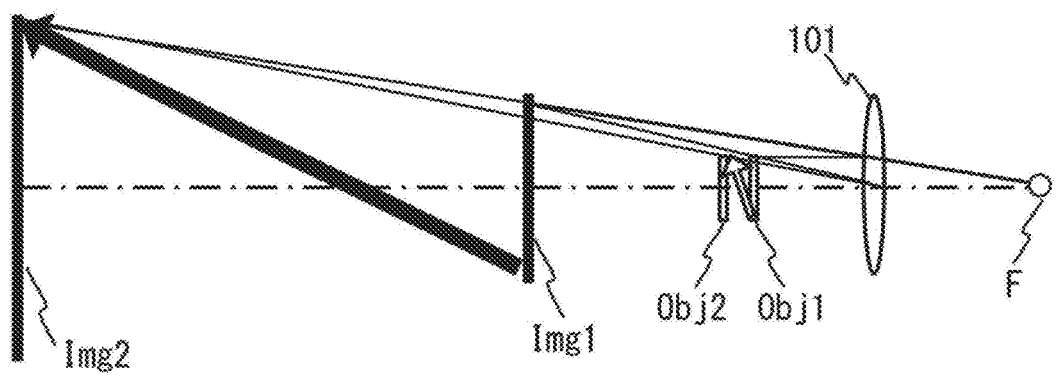
FIG. 18B is an explanatory diagram illustrating a tilted object in the virtual image optical system.

FIG. 18B uses drawing to find a position of image surface Img in relation to object Obj based on an intersection point between rays on condition that one ray parallel to the optical axis of the convex lens 101 focuses on focus position F of the convex lens 101 and another ray straight travels the center of the convex lens 101. In the virtual image optical system, object Obj is placed at a nearer position compared to focus position F of the convex lens 101. Unlike the real image optical system, two rays intersect at a position belonging to the same side as object Obj with reference to the convex lens 101.

Suppose the position (object position) of object Obj is moved from object position Obj1 to object position Obj2. The gradient of the ray passing through the center of the convex lens 101 decreases when object Obj is moved in a direction to be distant from the convex lens 101. The image thereby moves from image position Img1 to image position Img2. Namely, the image position gets away from the convex lens 101. As illustrated in FIG. 18B, part of object Obj is fixed to object position Obj1 and the other part thereof is moved to object position Obj2 to tilt object Obj. In this case, an image is formed to tilt in a direction opposite to the tilt of object Obj from image position Img1 to image position Img2.

In the virtual image optical system, the plane (the virtual image plane 7 according to the present embodiment) where a virtual image appears can be tilted so that the object surface corresponding to Img2 requiring a long virtual image distance corresponds to object position Obj2 distant from the convex lens 101.

Figure 19:
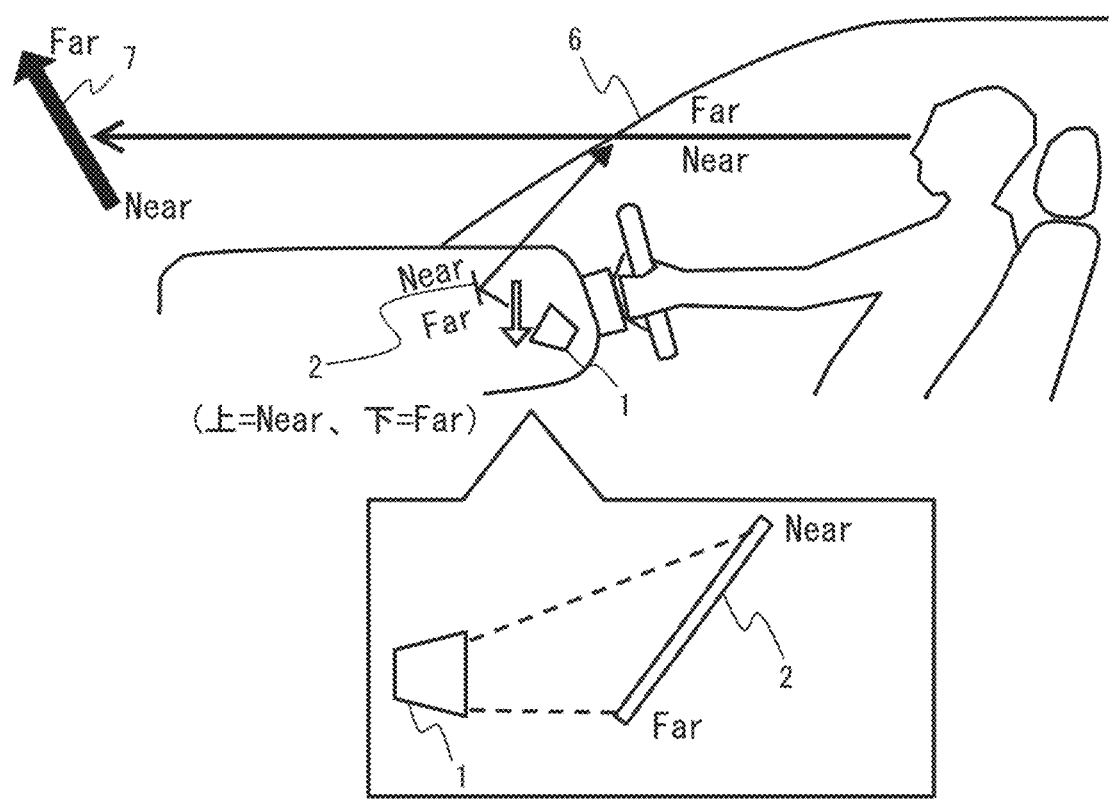
FIG. 19 is a diagram illustrating the relationship between the tilt direction of a screen plate and a virtual image according to a related art.

The virtual image plane 7 can be tilted by tilting the part corresponding to the object surface when the above-described principle is applied to the head-up display device 30 according to the present embodiment. This point will be described based on a conventionally known technology. FIG. 19 illustrates a case of tilting the liquid crystal display panel 2 comparable to a screen with reference to a light flux from the backlight 1 comparable to a projector based on the relationship between the projector to output image light fluxes and the screen according to a related art. With reference to the backlight 1, tilting the liquid crystal display panel 2 can tilt the virtual image plane 7.

In this case, the position of the liquid crystal display panel 2 corresponding to a far side (Far) of the tilted virtual image plane 7 is nearer to the backlight 1. The position of the liquid crystal display panel 2 corresponding to a near side (Near) of the tilted virtual image plane 7 is distant from the backlight 1.

"Being near to the backlight 1" is synonymous with "being distant from the windshield 6." "Being distant from the backlight 1" is synonymous with "being near to the windshield 6." Therefore, the tilt direction of the liquid crystal display panel 2 is equal to the direction of the Scheimpflug principle described with reference to FIG. 18.

Figure 20:
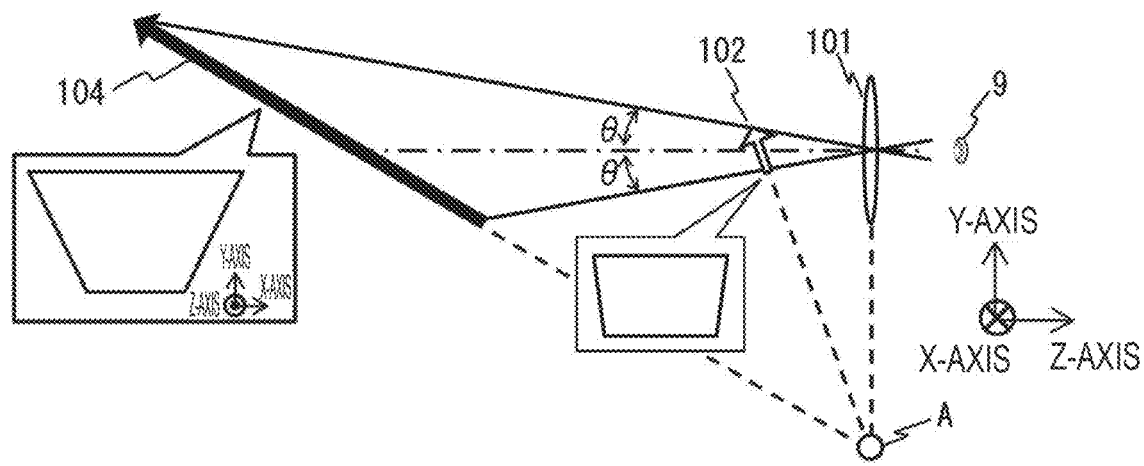
FIG. 20 is a diagram illustrating the relationship between a viewing angle and a space image according to the present invention.

As described above, the Scheimpflug principle causes trapezoid distortion in an image. The head-up display device 30 observes a virtual image from the position of the eye box 8. With reference to FIG. 20, the description below explains the trapezoid distortion when the virtual image plane 7 is tilted based on the Scheimpflug principle.

A field of view from the eye box 8 is assumed to be rectangular. When the eye 9 is positioned to the eye box 8, the virtual image needs to appear as an inverted trapezoid on the tilted virtual image plane 7 in order to view a rectangular field of view while the virtual image is observed. The "inverted trapezoid" signifies that a virtual image is distorted to be longer at the top and to be shorter at the bottom in the field of view. The relationship between being "far or near" in terms of an object distance approximates to 1 compared to the relationship between being "far or near" in terms of a virtual image distance. The inverted trapezoid approximates to a rectangle on the object surface.

Providing the liquid crystal display panel 2 for the object surface requires a process to display a video within an inverted trapezoid range in the range of the liquid crystal display panel 2 to display a video. In addition, the number of effective pixels decreases, thus reducing the amount of displayable information.

When the virtual image plane 7 is tilted, the virtual image is formed into an inverted trapezoid. A trapezoid distortion on the liquid crystal display panel 2 is corrected by using a non-rotationally symmetric free curved surface concave mirror 54 (see FIG. 2) and a free curved surface lens 52. In addition, the liquid crystal display panel 2 is tilted in a direction opposite to the Scheimpflug principle. Configuring the eyepiece optical system 5 using the above-described positional relationship makes it possible to correct a trapezoid distortion resulting from tilting the liquid crystal display panel 2.

To satisfy telecentric requirements (the exit pupil is at infinity) for the liquid crystal display panel 2, the performance can be further improved by placing a concave lens as a field lens to provide negative refractive power (power) between the free curved surface lens 52 and the liquid crystal display panel 2.

Figure 21:
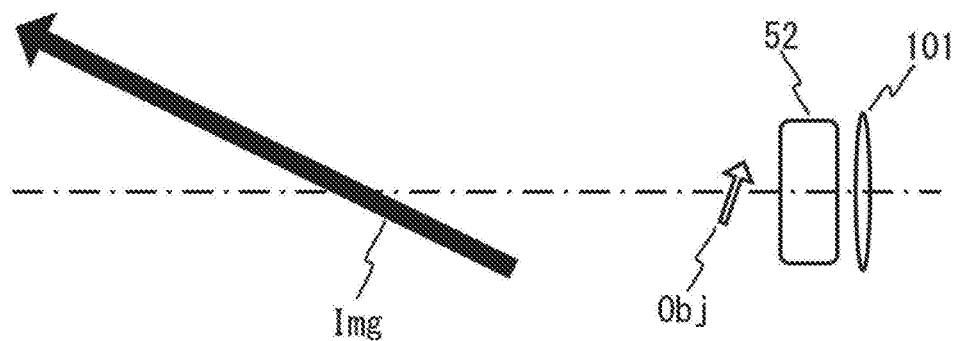
FIG. 21 is a diagram illustrating a tilt direction of the liquid crystal display panel according to the present invention.

Summing up the above, the head-up display device 30 allows a virtual image to be observed from the position of the eye box 8 even when the virtual image plane 7 is tilted. The trapezoid distortion of the virtual image is not recognized if the viewing angle viewed from an observer is rectangular. Tilting the virtual image plane just requires displaying a virtual image distorted into an inverted trapezoid so that the trapezoid distortion is not observed when viewed from the eye box 8. In this case, as illustrated in FIG. 21, it is important to correct the trapezoid distortion on the screen (liquid crystal display panel 2) comparable to the object surface.

Namely, the non-rotationally symmetric free curved surface concave mirror 54 and the free curved surface lens 52 are used. In addition, the liquid crystal display panel 2 is tilted in a direction opposite to the Scheimpflug principle. This makes it possible to form the virtual image into an inverted trapezoid and correct the trapezoid distortion on the liquid crystal display panel 2 while the virtual image plane 7 remains tilted.

The free curved surface lens 52 includes an XY polynomial while a detailed definitional equation will be described later. The free curved surface lens 52 can, therefore, provide a right-left and up-down asymmetric lens action and effectively correct the right-left and up-down asymmetric distortion performance that occurs at the windshield 6.

The description below explains a first embodiment of the projection optical system capable of providing the small-sized head-up display device 30 using the free curved surface concave mirror 54, the free curved surface lens 52, and a concave lens 51.

First Embodiment

Figure 1A:
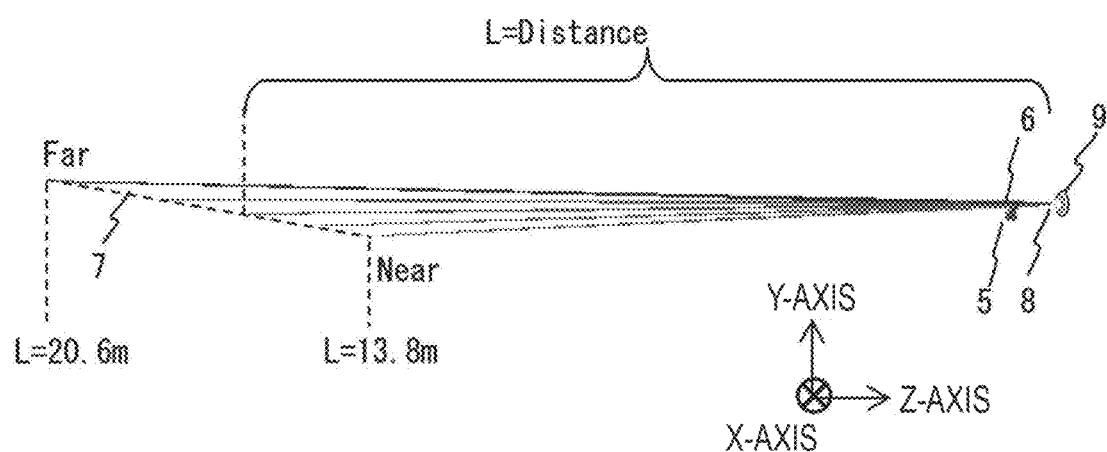
FIG. 1A is an overall ray diagram (YZ plane) illustrating an eyepiece optical system according to a first embodiment.
Figure 1B:
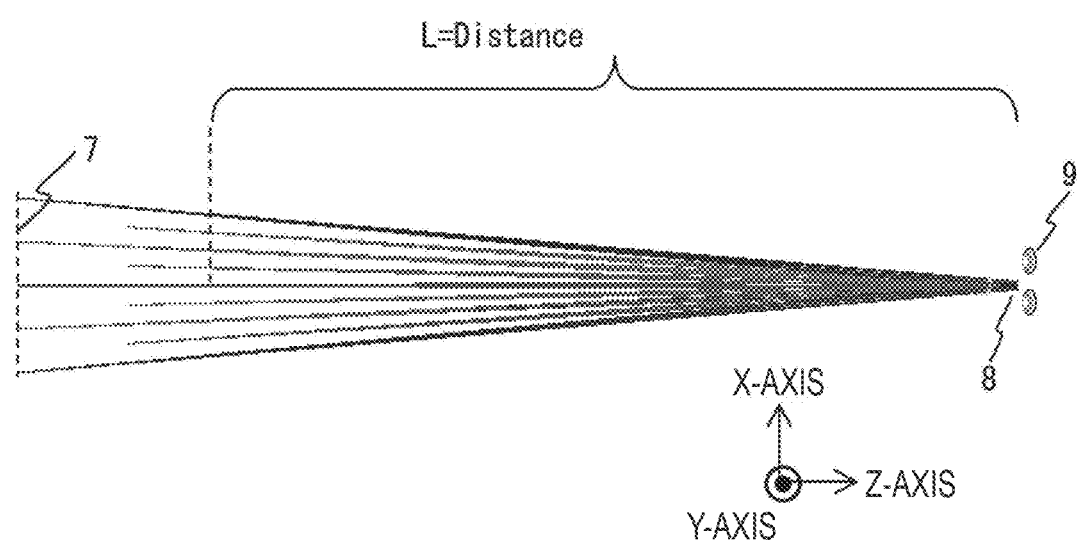
FIG. 1B is an overall ray diagram (XZ plane) illustrating the eyepiece optical system according to the first embodiment.

The first embodiment is characterized in the configuration of the eyepiece optical system 5 in the head-up display device 30 illustrated in FIG. 22. With reference to FIGS. 1A and 1B, the description below first explains the windshield 6 and the eyepiece optical system 5 included in the projection optical system 20. FIG. 1A is an overall ray diagram of the eyepiece optical system 5 according to the first embodiment. FIG. 1A illustrates that the eye 9 of an observer is directed to image information over the virtual image plane 7 in a YZ plane defined by the horizontal X-axis, the vertical Y-axis, and the Z-axis orthogonal to the XY-axis of the eye box 8. FIG. 1B is an overall ray diagram of the eyepiece optical system 5 according to the first embodiment. FIG. 1B illustrates that the eye 9 of the observer is directed to image information over the virtual image plane 7 in an XZ plane defined similarly. In FIG. 1A, the eye 9 of the observer represents that the right and left eyes are positioned at the same level.

As illustrated in FIG. 1A, the virtual image plane 7 is tilted approximately 80 degrees against the line of sight. Specifically, the virtual image plane 7 is tilted in the line of sight in the eyepiece optical system 5 so that the virtual image distance is 20.6 m at the positive side of the Y-coordinate above the field of view and the virtual image distance is 13.8 m at the negative side of the Y-coordinate below the field of view. Therefore, the range of the virtual image (virtual image range) displayed on the virtual image plane 7 according to the present embodiment is found by dividing the far part by the near part, namely, 20.6/13.8≈1.5. The virtual image range according to the present embodiment can display a wide range of the virtual image. The windshield 6 is symmetrically shaped in the right-left direction of the automobile.

Figure 2:
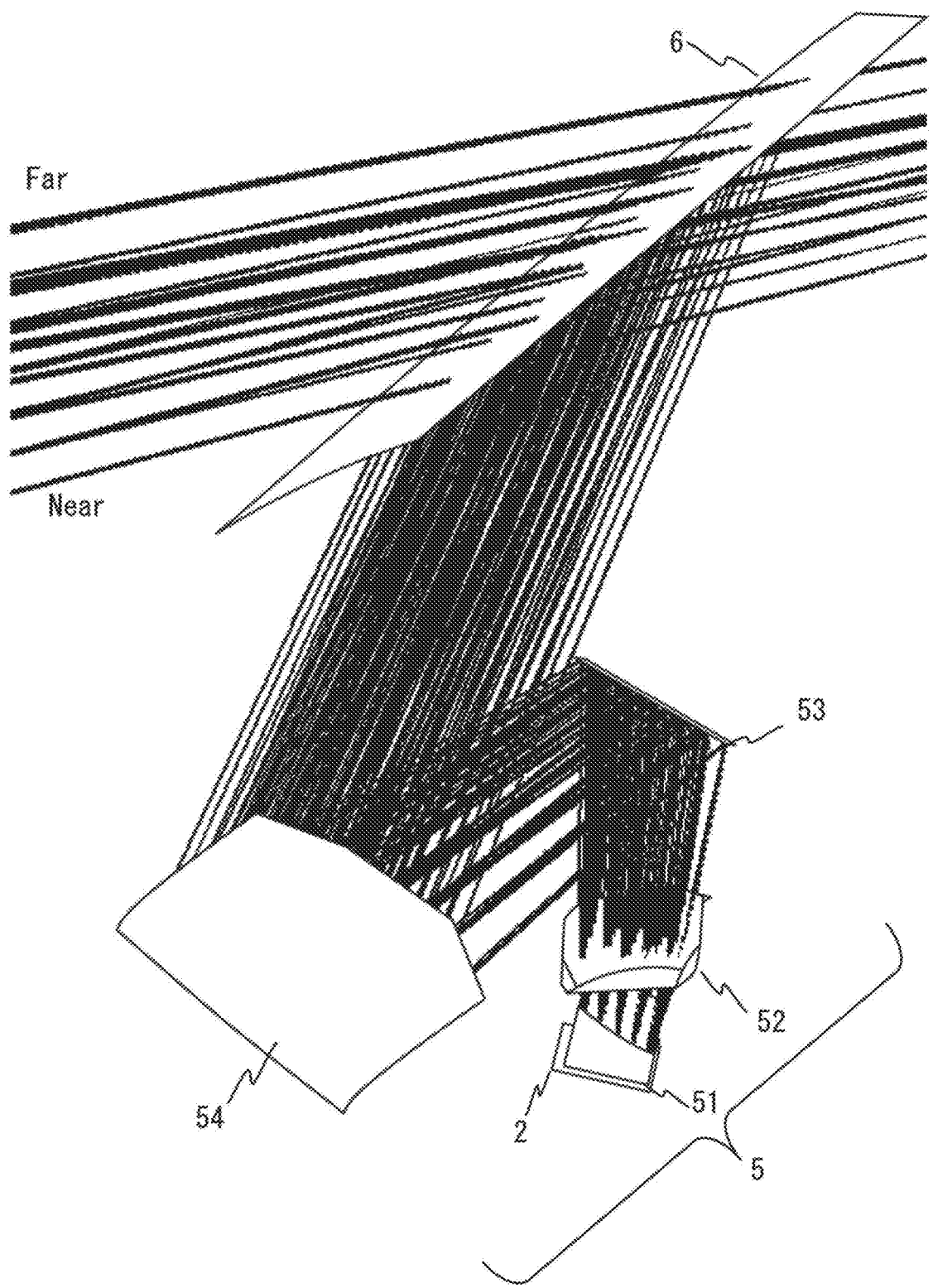
FIG. 2 is a partially enlarged diagram illustrating the eyepiece optical system according to the first embodiment.

FIG. 2 is a partially enlarged diagram illustrating the eyepiece optical system 5 according to the first embodiment. As illustrated in FIG. 2, the eyepiece optical system 5 is configured by successively placing the concave lens 51, the free curved surface lens 52, a reflecting mirror 53, the free curved surface concave mirror 54 having positive refractive power, and the windshield 6 in order from the liquid crystal display panel 2 along the direction of emitting an image light flux at the liquid crystal display panel 2. The free curved surface concave mirror 54 mainly supplies the refractive power for the eyepiece optical system 5. The concave lens 51 mainly provides the telecentric capability. The free curved surface lens 52 mainly corrects the distortion.

As illustrated in FIG. 2, the eyepiece optical system 5 according to the first embodiment can miniaturize the head-up display device 30 by positioning the reflecting mirror 53 below an optical path along which the image light flux reflecting off the windshield 6 is directed to the free curved surface concave mirror 54.

Figure 3:
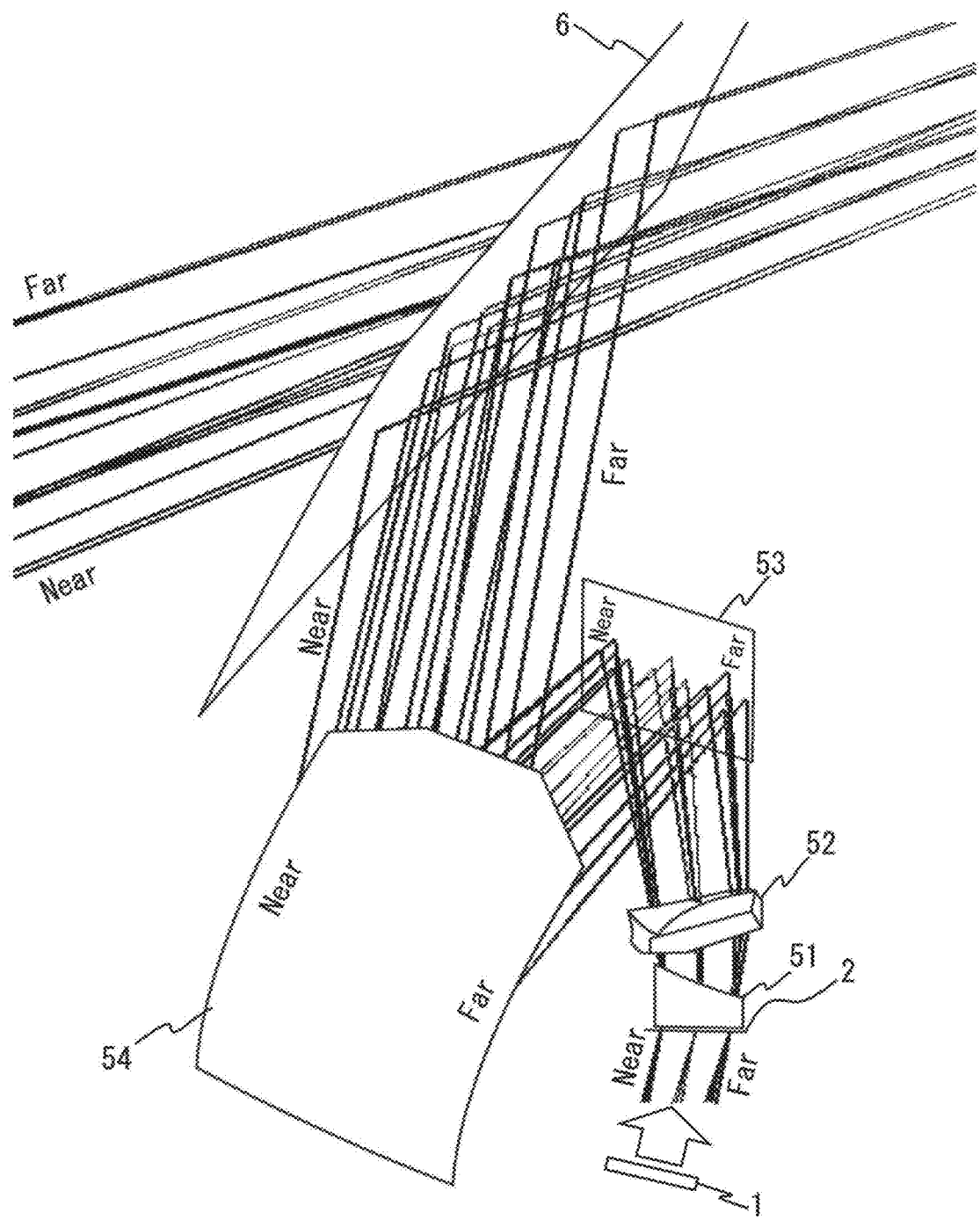
FIG. 3 is a diagram illustrating tilt of a liquid crystal display panel according to the first embodiment.
Figure 6A:
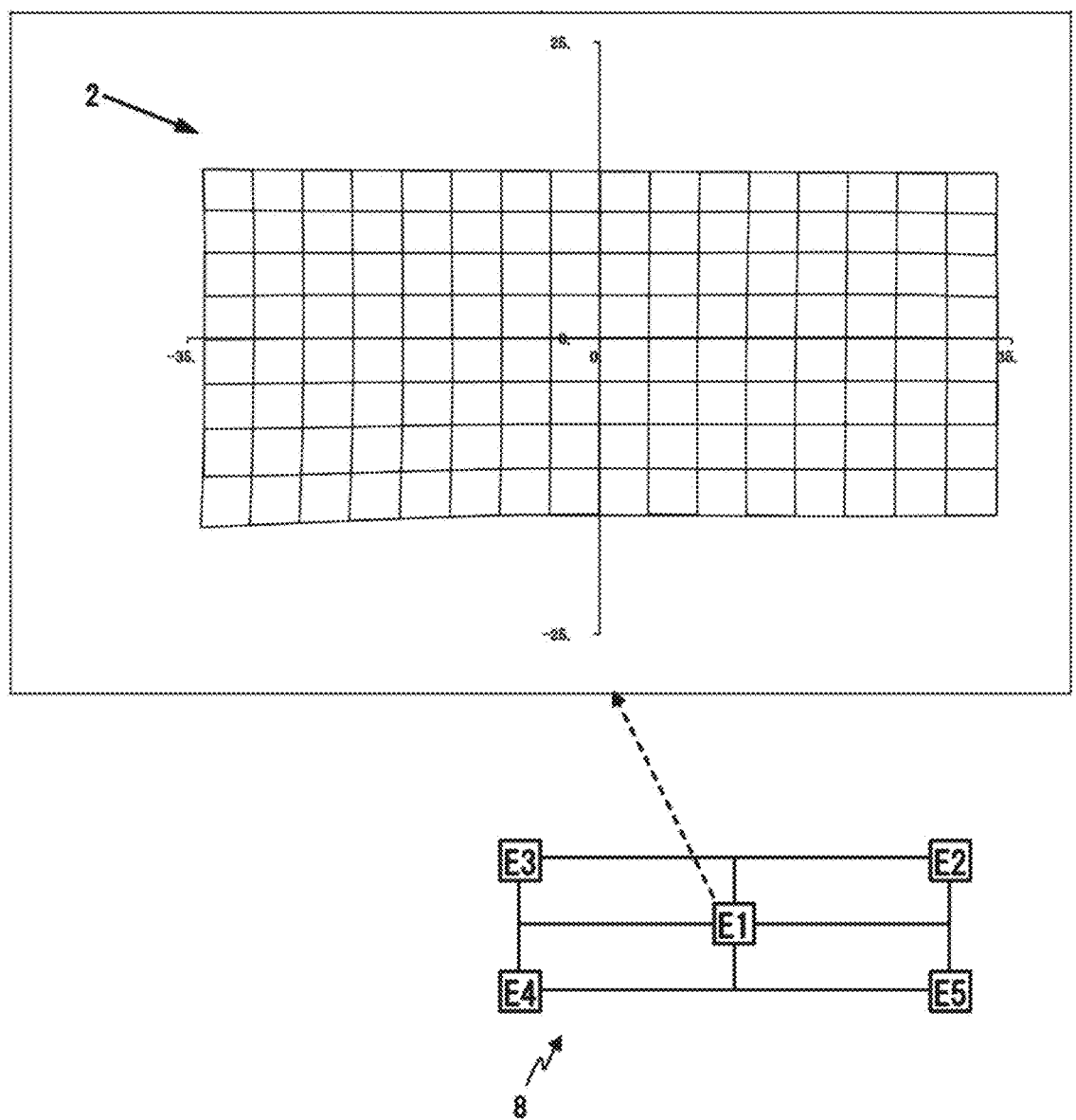
FIG. 6A is a diagram illustrating distortion performance viewed from the center of an eye box according to the first embodiment.
Figure 6B:
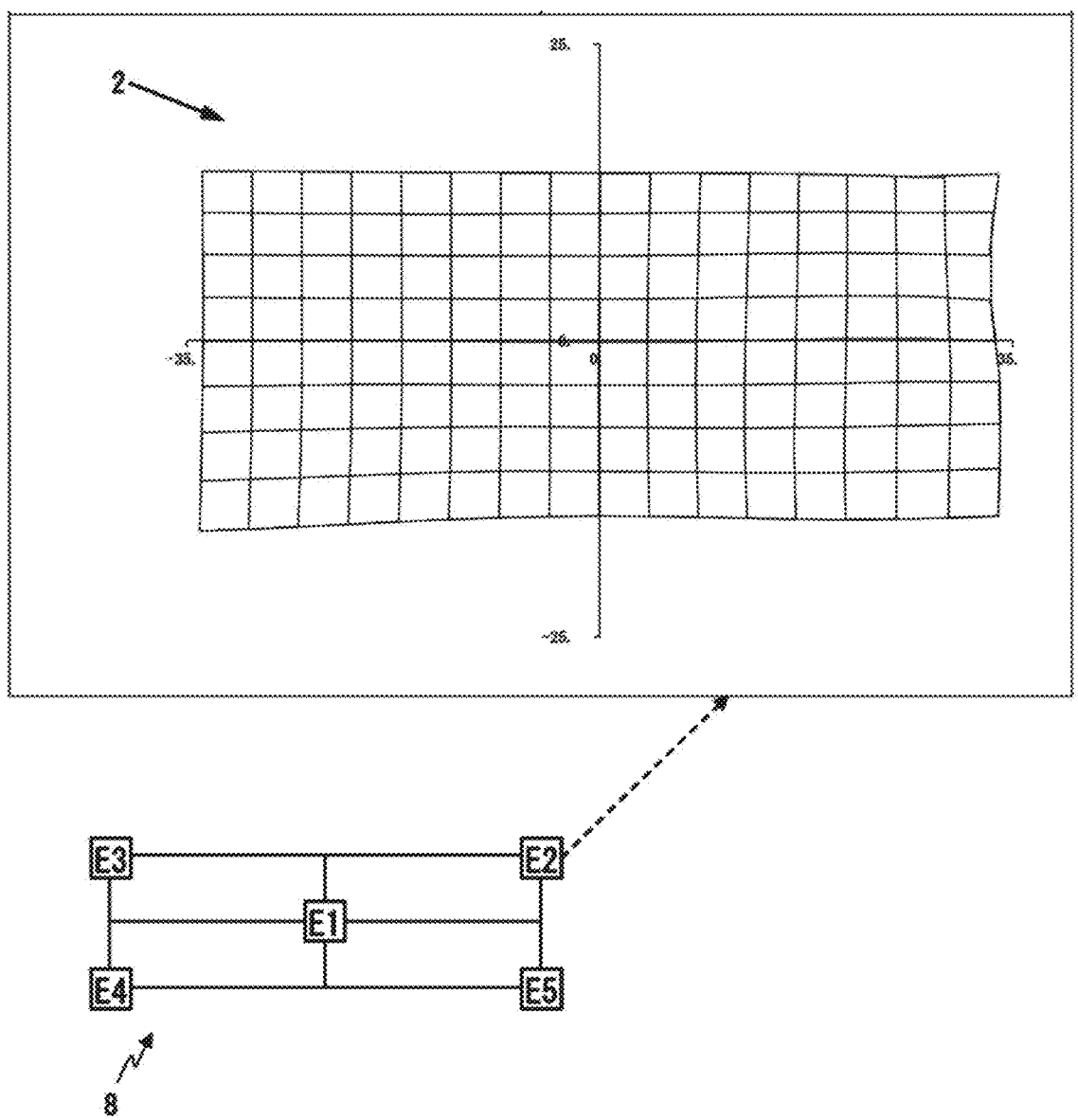
FIG. 6B is a diagram illustrating distortion performance viewed from the top right of the eye box according to the first embodiment.
Figure 6C:
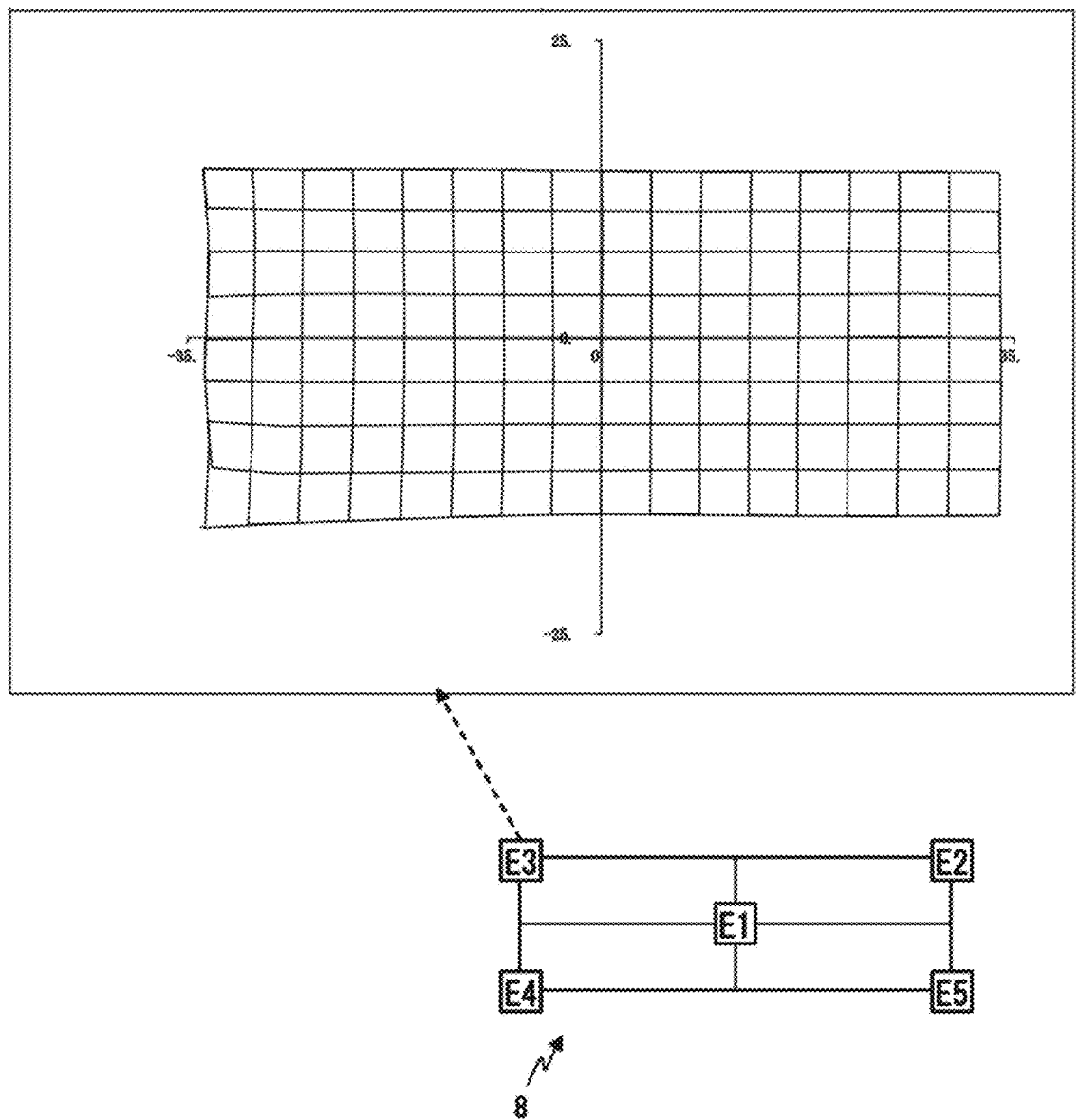
FIG. 6C is a diagram illustrating distortion performance viewed from the top left of the eye box according to the first embodiment.
Figure 6D:
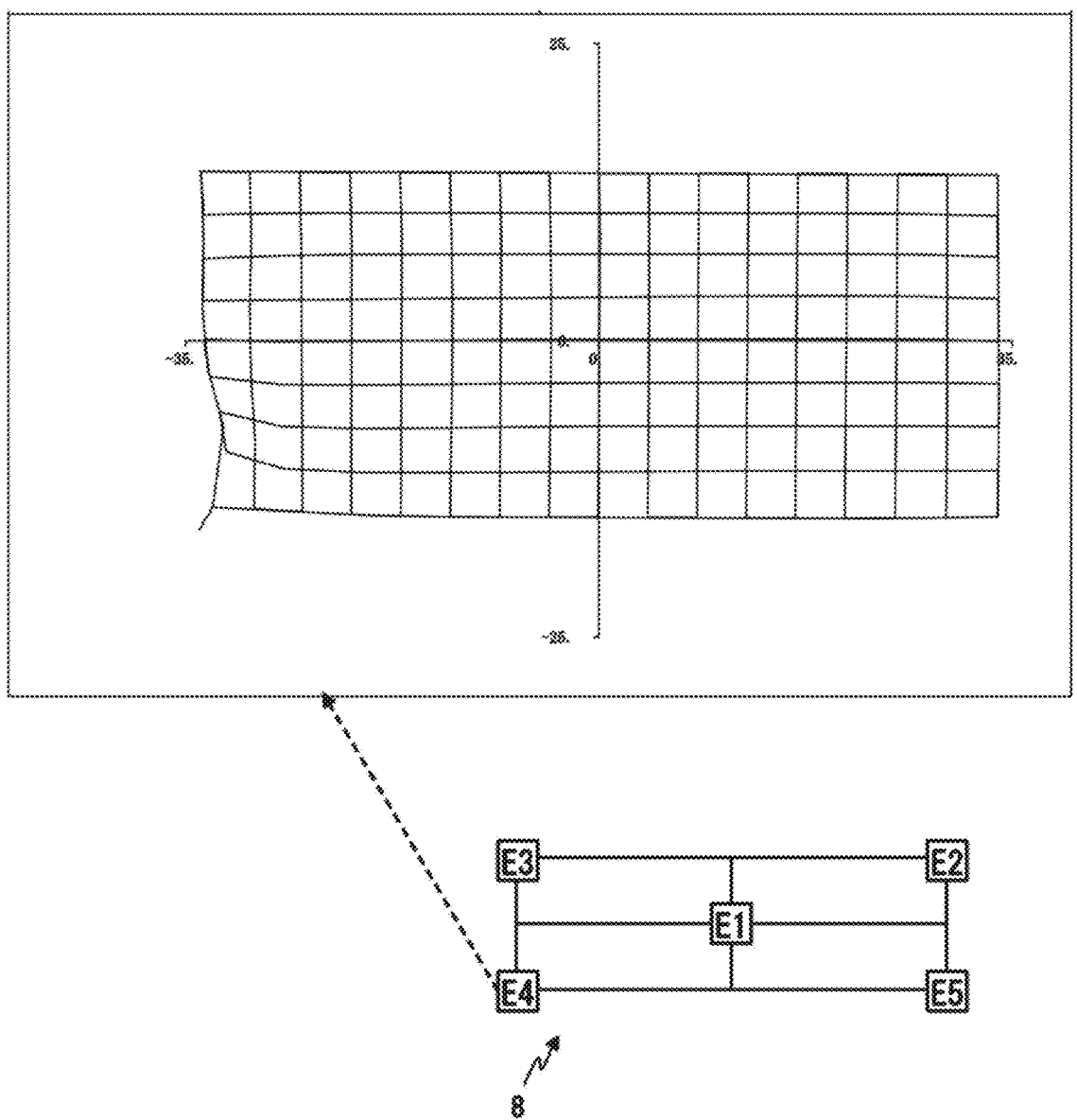
FIG. 6D is a diagram illustrating distortion performance viewed from the bottom left of the eye box according to the first embodiment.
Figure 6E:
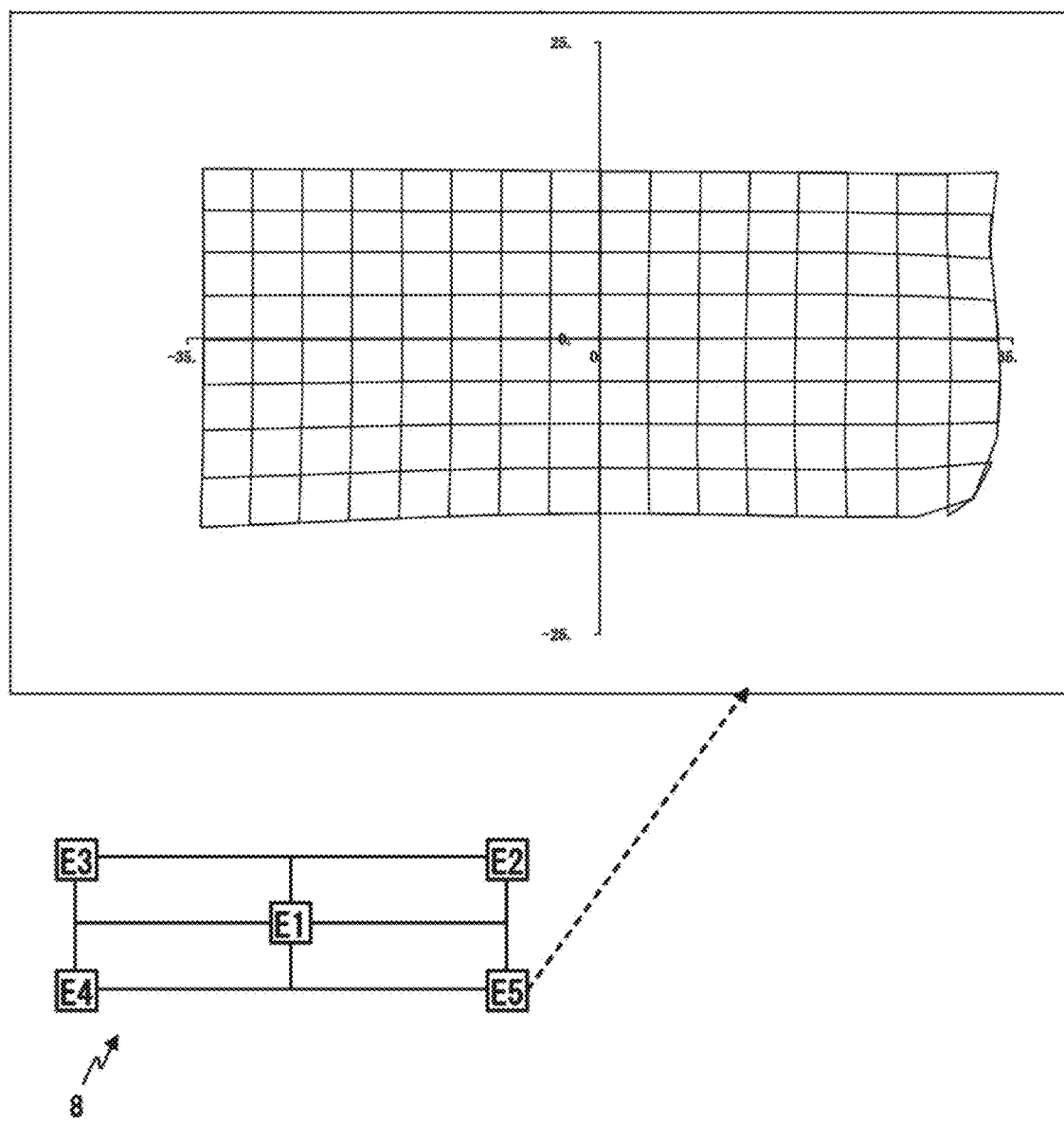
FIG. 6E is a diagram illustrating distortion performance viewed from the bottom right of the eye box according to the first embodiment.

FIG. 3 is a ray diagram of rays drawn up to the rear of the liquid crystal display panel 2 in order to illustrate the tilt direction of the liquid crystal display panel 2. In FIG. 3, a ray corresponding to the far virtual image distance is denoted as "Far," a ray corresponding to the near virtual image distance is denoted as "Near," and intervening rays are also shown in order to easily understand the relationship between rays and the tilt of the liquid crystal display panel 2.

The description below assumes that a far point signifies the position corresponding to the ray at the Far side in the virtual image plane 7 (see FIG. 1) and a near point signifies the position corresponding to the ray at the Near side in the virtual image plane 7 (see FIG. 1).

In the eyepiece optical system 5 according to the present embodiment, as illustrated in FIG. 3, a point on the liquid crystal display panel 2 conjugating to the far point (Far) is optically farther from the light flux toward the backlight 1 than a point on the liquid crystal display panel 2 conjugating to the near point (Near) on the virtual image plane 7. From another perspective, according to the present embodiment, a point on the liquid crystal display panel 2 conjugating to the far point (Far) on the virtual image plane 7 is optically farther from the light flux entering the liquid crystal display panel 2 than a point on the liquid crystal display panel 2 conjugating to the near point (Near) on the virtual image plane 7.

From still another perspective, a point on the liquid crystal display panel 2 conjugating to the far point (Far) on the virtual image plane 7 is optically nearer to the light flux toward the free curved surface concave mirror 54 (windshield 6) than a point on the liquid crystal display panel 2 conjugating to the near point (Near) on the virtual image plane 7.

From yet another perspective, the far point (Far) is assumed to belong to an upper part of the virtual image plane 7 in the Y-axis direction (see FIG. 1A) and to be relatively far from the eye box 8. The near point (Near) is assumed to belong to a lower part of the virtual image plane 7 in the Y-axis direction (see FIG. 1A) and to be relatively nearer to the eye box 8. In this case, a point on the liquid crystal display panel 2 conjugating to the far point (Far) is optically farther from the light flux toward the backlight 1 (the light flux entering the liquid crystal display panel 2) than a point on the liquid crystal display panel 2 conjugating to the near point (Near). Namely, a point on the liquid crystal display panel 2 conjugating to the far point (Far) is optically nearer to the light flux toward the free curved surface concave mirror 54 than a point on the liquid crystal display panel 2 conjugating to the near point (Near).

Therefore, the tilt direction of the liquid crystal display panel 2 according to the present embodiment is opposite to the orientation of the screen tilt according to the related art described with reference to FIG. 19.

"Being optically near to or far from the light flux" here signifies "being near to or far from the light flux" passing through the liquid crystal display panel 2. Physical distances are irrelevant even if a medium is filled or optical parts are placed in the space in front of or behind the liquid crystal display panel 2.

FIG. 4 is a diagram illustrating lens data of the head-up display device 30 according to the first embodiment. Of the lens data in FIG. 4, "curvature radius" uses a positive sign when the center position of the curvature radius belongs to a traveling direction. "Interplanar distance" represents a distance on the optical axis between a vertex position on each plane and a vertex position on the next plane. "Decentering" represents values corresponding to the directions along the X-, Y-, and Z-axes. "Tilting" signifies rotations around the X-, Y-, and Z-axes.

"Contents of decentering and tilting" act on the relevant plane in the order of decentering and tilting. "Normal decentering" signifies that the next plane is placed at the position corresponding to an interplanar distance in a new coordinate system where decentering and tilting act. "Decentering and return" signifies that decentering and tilting act only on the relevant plane and does not affect the next plane. A clockwise rotation around the X-axis is positive when viewed in the positive direction of the X-axis. A clockwise rotation around the Y-axis is positive when viewed in the positive direction of the Y-axis. A counter-clockwise rotation around the Z-axis is positive when viewed in the positive direction of the Z-axis.

"Glass material name" signifies names of materials used for optical elements such as lens, glass, and mirror. "50.30" signifies a material having a refractive index of 1.50 and Abbe number 30. "52.60" signifies a material having a refractive index of 1.52 and Abbe number 60.

FIG. 5 is a diagram illustrating free curved surface coefficients for the head-up display device 30 according to the first embodiment. The free curved surface coefficients in FIG. 5 are found by using formula (1) below.

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n) \qquad \text{[Formula 1]}$$
$$j = [(m+n)^2 + m + 3n]/2 + 1$$

In formula (1), free curved surface coefficient Cj represents a shape rotationally asymmetric with each optical axis (Z-axis). The shape is defined by components of the cone term and components of the XY polynomial term. For example, given that X is squared (m=2) and Y is cubic (n=3), then, j={$(2+3)^2$+2+3×3}/2+1=19. The corresponding coefficient is C19. Optical axis positions on the free curved surface depend on the amount of "decentering and tilting" in the lens data in FIG. 4.

Table 1 exemplifies specific numeric values such as an eye box size (size of the eye box 8) and a viewing angle in the eyepiece optical system 5 according to the present embodiment. In Table 1, the numeric values are sequenced in the order of the horizontal direction and the vertical direction.

TABLE 1

| | |
|---|---|
| Size of the eye box 8 | 130 × 40 mm |
| Effective size of image light in the liquid crystal display panel 2 | 67.4 × 29.0 mm |
| Viewing angle (total angle of view) | 10 × 4 degrees |
| Inclination | 0.7 degrees |
| Virtual image distance (L) | 16.5 m (inclination direction) |
| Tilt of the virtual image plane 7 against the inclination | 80 degrees |

Dividing a focal length (−143 mm) of the concave lens by a focal length (355 mm) of the free curved surface concave mirror yields a value of −0.40.

The description below explains the optical performance according to the first embodiment with reference to FIGS. 6A through 6E, 7, 8A, and 8B. In more detail, FIG. 6 provides a distortion diagram at the liquid crystal display panel 2 based on a ray passing through the center of the eye box 8 within the rectangular virtual image range. FIGS. 6B, 6C, 6D, and 6E provide distortion diagrams at the liquid crystal display panel 2 based on rays passing through the corner points at the top right, the top left, the bottom left, and the bottom right of the eye box 8.

Suppose the eye 9 is placed at the respective positions in the eye box 8 while the liquid crystal display panel 2 displays a rectangular image. In such a case, distortions opposite to FIG. 6A through 6E are observed (such as barrel-shaped⇔bobbin-shaped). The distortion diagrams in FIGS. 6A through 6E are almost equally shaped. Therefore, an observer can observe a rectangular virtual image with no distortion if the liquid crystal display panel 2 displays videos corresponding to the distortion diagrams in FIGS. 6A through 6E.

Figure 7:
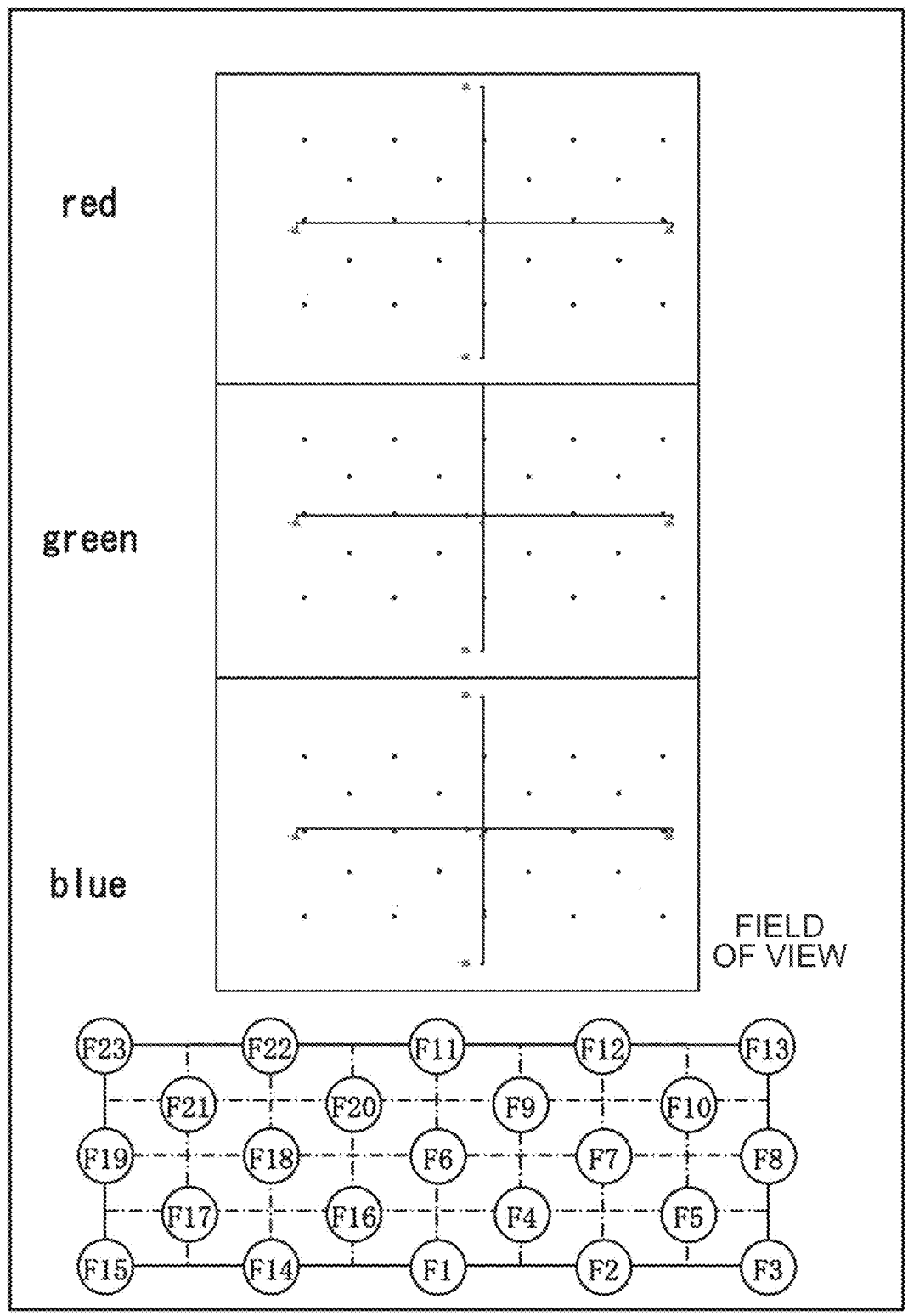
FIG. 7 is a spot diagram illustrating colors in the eyepiece optical system according to the first embodiment.

FIG. 7 is a spot diagram for the head-up display device 30 according to the first embodiment. FIG. 7 provides a spot diagram on the liquid crystal display panel 2 when object points are placed on the virtual image plane. The spot diagram is separated into red color (650 nm), green color (550 nm), and blue color (450 nm) based on light fluxes passing through the whole of the eye box 8. This spot diagram uses all light fluxes through the eye box 8 sized 130 mm horizontally and 40 mm vertically. When the observer actually views a virtual image, the spot diagram is greatly improved based on the iris size (supposed to be φ7 mm at a maximum) of the human eye. The spot diagram is created by magnifying five times a spot diagram at each point of the liquid crystal display panel 2 in an optical reduction system using the virtual image as an object surface.

Figure 8A:
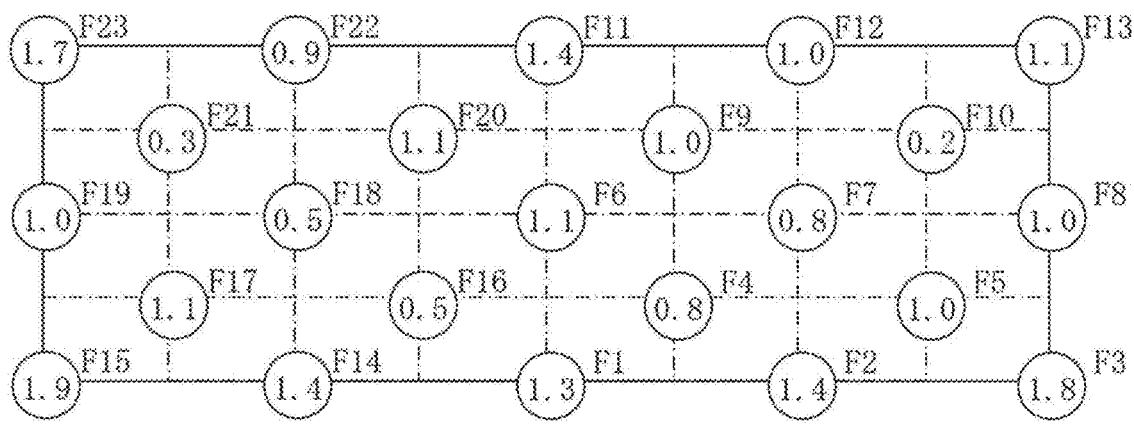
FIG. 8A is a diagram illustrating the deviation of an angle between principal ray Ray1 and virtual ray Ray0 at each angle of view.
Figure 8B:
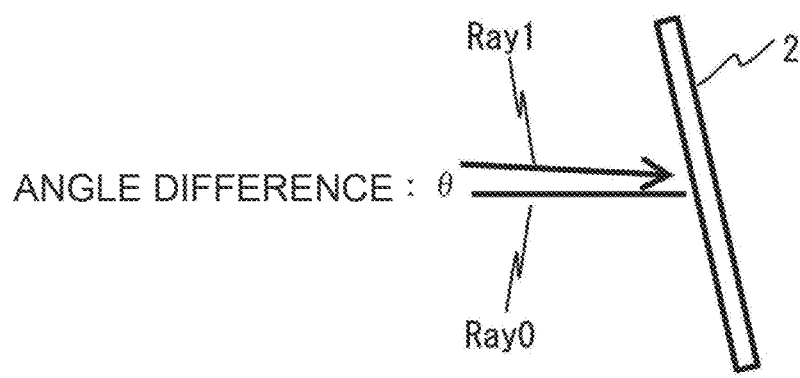
FIG. 8B is a diagram illustrating angle θ between principal ray Ray1 and virtual ray Ray0.

FIG. 8A is a diagram illustrating the deviation of an angle between principal ray Ray1 and virtual ray Ray0 at each angle of view. FIG. 8B is a diagram illustrating angle θ between principal ray Ray1 and virtual ray Ray0. As illustrated in FIG. 8B, virtual ray Ray0 corresponds to a straight line resulting from rotating the normal line of the liquid crystal display panel 2 by 13 degrees around the rotation axis parallel to the long side of the liquid crystal display panel 2. This signifies that an illumination optical system is tilted 13 degrees against the liquid crystal display panel 2. FIG. 8A shows that the angle deviation is small based on the maximum value of 1.9 degrees.

According to the present embodiment, the projection optical system uses the free curved surface concave mirror 54, the free curved surface lens 52, and the concave lens. The liquid crystal display panel 2 is tilted in a direction opposite to the Scheimpflug principle in the virtual image optical system. Therefore, it is possible to provide the head-up display device 30 that enables the virtual image plane 7 to tilt.

Second Embodiment

The second embodiment is characterized in that the configuration of the eyepiece optical system 5 differs from the first embodiment. The second embodiment prioritizes miniaturization of the head-up display device 30 by combining with the small-sized liquid crystal display panel 2 and eliminating the reflecting mirror 53.

Figure 9A:
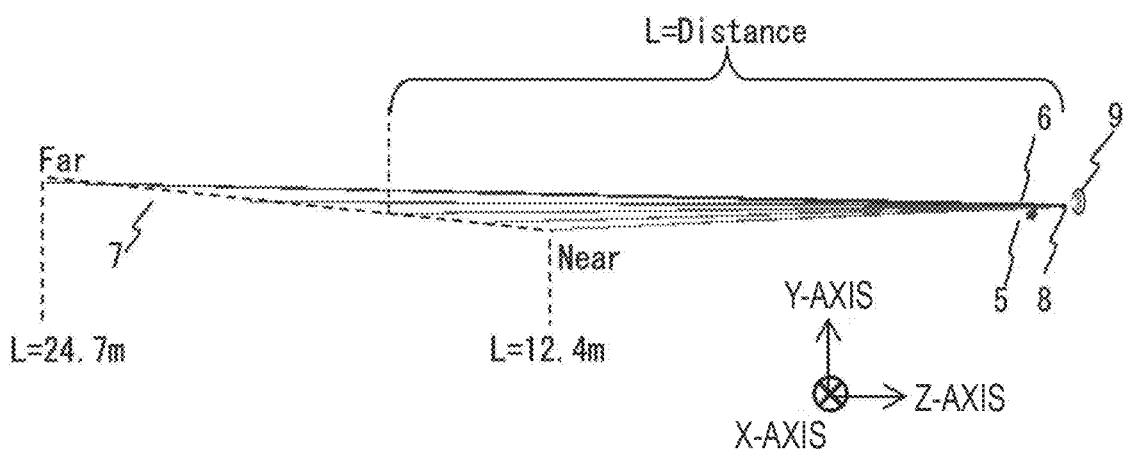
FIG. 9A is an overall ray diagram (YZ plane) illustrating an eyepiece optical system according to a second embodiment.
Figure 9B:
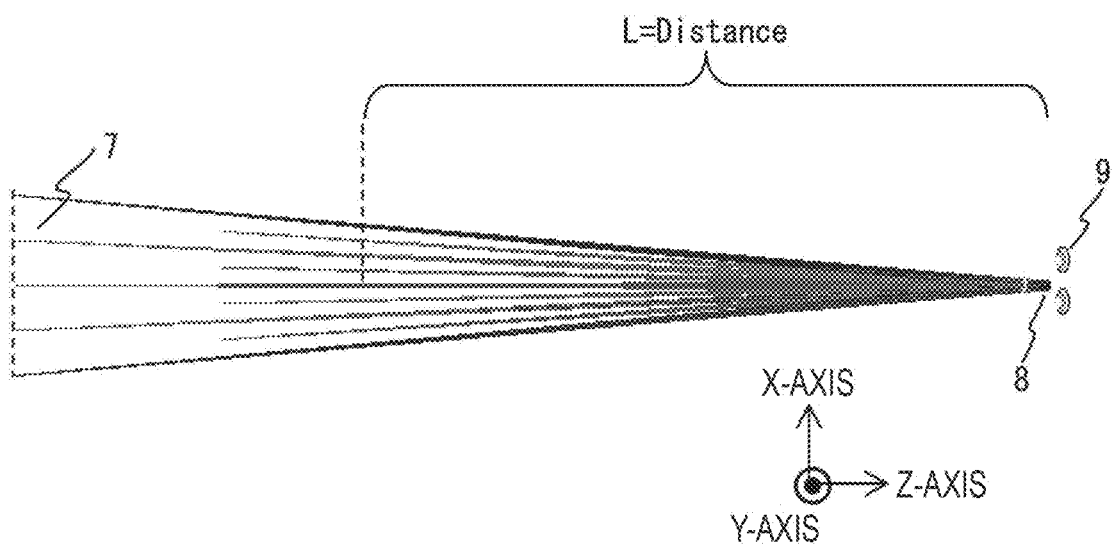
FIG. 9B is a diagram illustrating an overall ray diagram (XZ plane) illustrating the eyepiece optical system according to the second embodiment.

FIG. 9A is an overall ray diagram illustrating the eyepiece optical system 5 according to the second embodiment. FIG. 9A shows an aspect in which the eye of an observer is directed to image information on the virtual image plane 7 viewed from a YZ plane defined by the horizontal X-axis, the vertical Y-axis, and the Z-axis orthogonal to the XY-axes with reference to the eye box 8. FIG. 9B shows an aspect in which the eye of an observer is directed to image information on the virtual image plane 7 viewed from an XZ plane.

As seen from FIG. 9A, the virtual image plane 7 is greatly tilted 84 degrees against the line of sight due to an action of the eyepiece optical system 5 according to the present embodiment. Specifically, the virtual image distance is increased to 24.7 m at the top of the field of view (positive side of the Y-coordinate). The virtual image distance is decreased to 12.4 m at the bottom of the field of view (negative side of the Y-coordinate). There is provided a wide virtual image range such as a magnification of 2.0 found by dividing the far part by the near part. The windshield 6 is symmetrically shaped in the right-left direction of the automobile.

Figure 10:
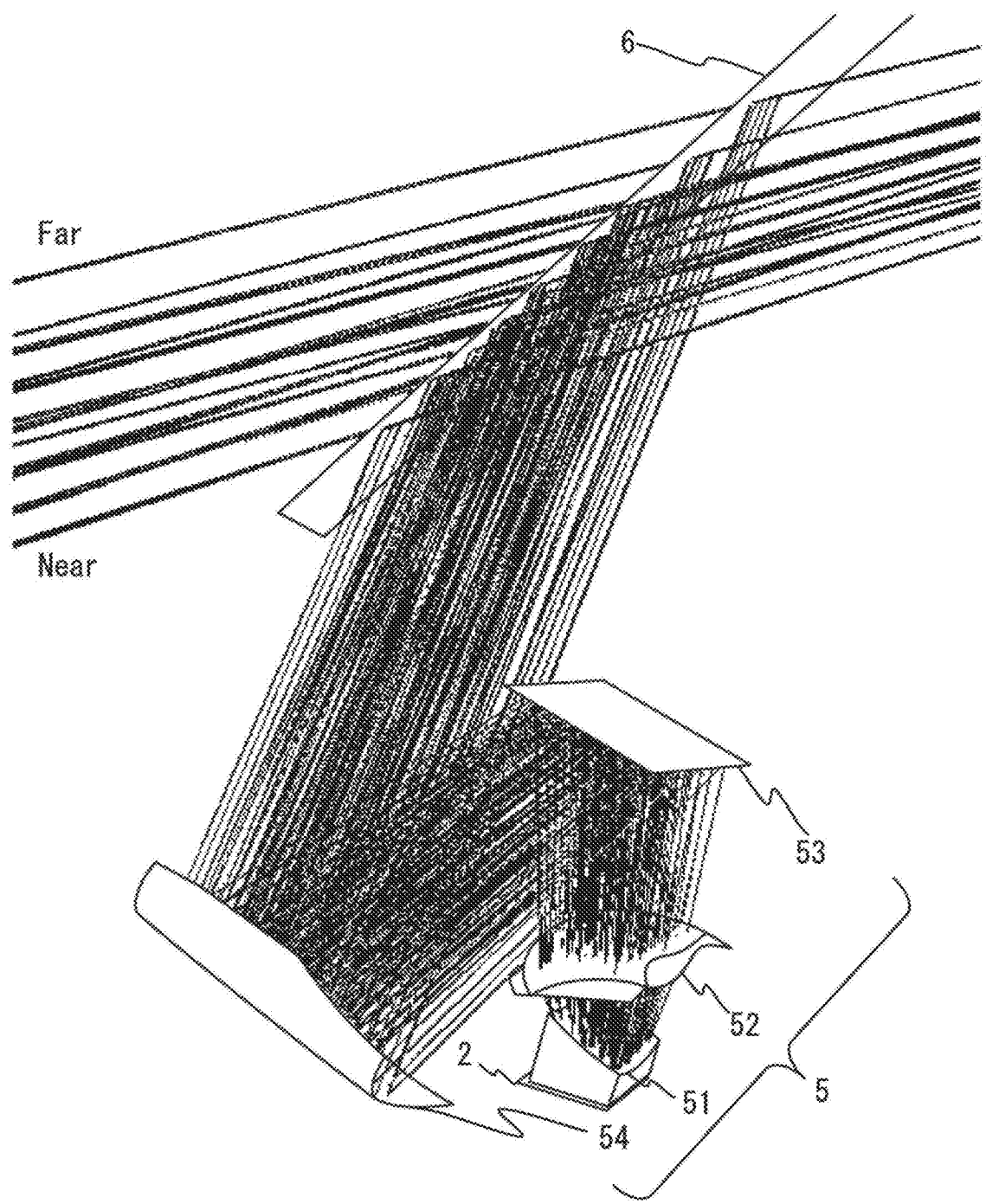
FIG. 10 is a partially enlarged diagram illustrating the eyepiece optical system according to the second embodiment.

FIG. 10 is a partially enlarged diagram illustrating the eyepiece optical system according to the second embodiment. As illustrated in FIG. 10, the eyepiece optical system 5 is configured by successively placing the concave lens 51, the free curved surface lens 52, the free curved surface concave mirror 54 having positive refractive power, and the windshield 6 in order from a polarization plate 21 (a component part of the liquid crystal display panel 2).

Figure 11:
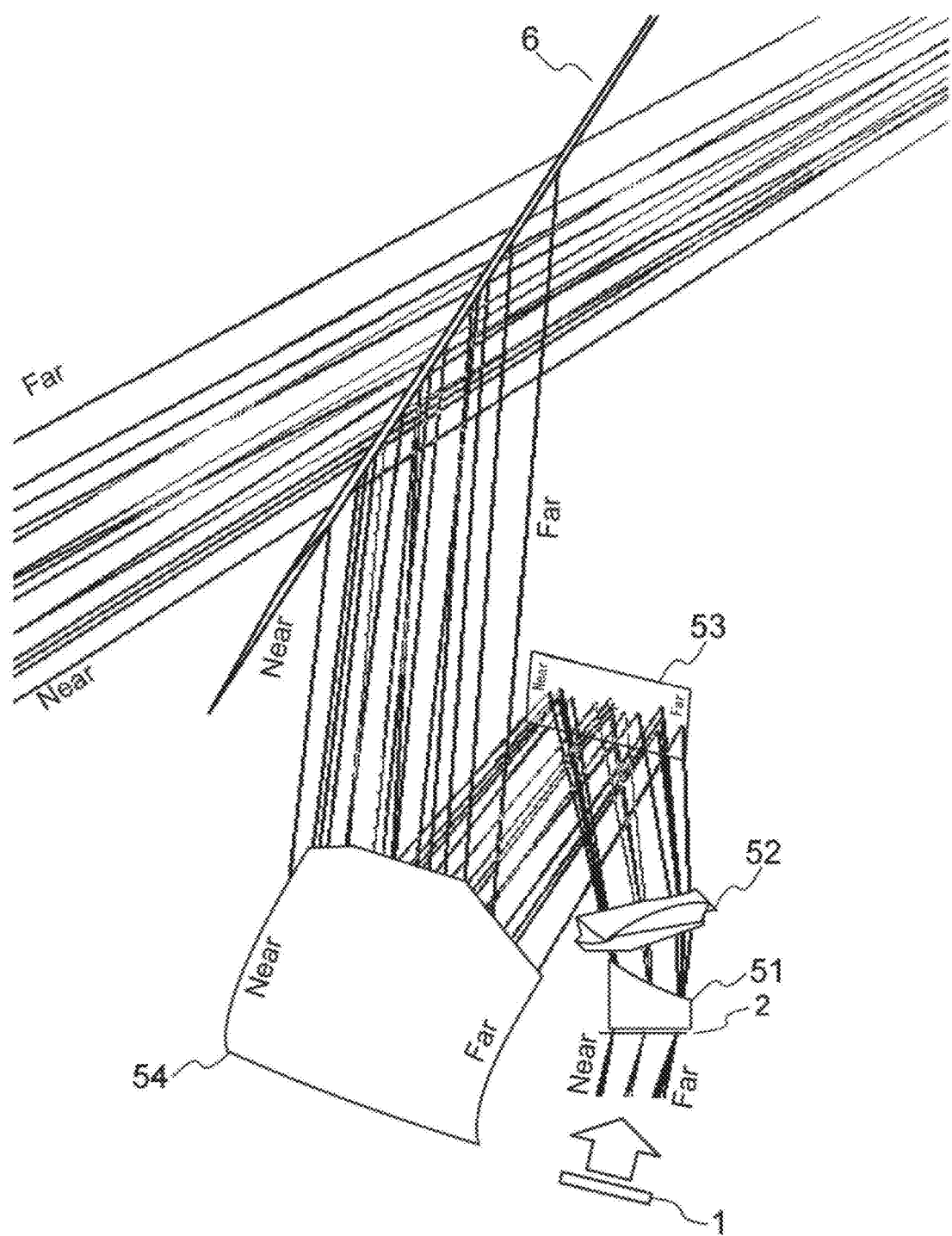
FIG. 11 is a diagram illustrating tilt of a liquid crystal display panel according to the second embodiment.

FIG. 11 is a ray diagram of rays drawn up to the rear of the liquid crystal display panel 2 in order to illustrate the tilt direction of the liquid crystal display panel 2. This ray diagram shows only a ray at the side corresponding to the long virtual image distance (Far), a ray at the side corresponding to the short virtual image distance (Near), and intervening rays for ease of comprehension. As seen from the diagram, a point on the liquid crystal display panel 2 conjugating to the far point (Far) on the virtual image plane is optically farther from the light flux toward the backlight 1 than a point on the liquid crystal display panel 2 conjugating to the near point (Near) on the virtual image plane. Namely, a point on the liquid crystal display panel 2 conjugating to the far point (Far) on the virtual image plane is optically nearer to the light flux toward the free curved surface concave mirror 54 (windshield 6) than a point on the liquid crystal display panel 2 conjugating to the near-far point (Near) on the virtual image plane.

Therefore, the tilt direction of the liquid crystal display panel 2 is opposite to the screen tilt orientation according to patent literature 3 described with reference to FIG. 19.

"Being optically near to or far from the light flux" here signifies being near to or far from the light flux passing through the liquid crystal display panel 2. Physical distances are irrelevant even if a medium is filled or optical parts are placed in the space in front of or behind the liquid crystal display panel 2.

FIG. 12 is a diagram illustrating lens data of the head-up display device 30 according to the second embodiment. FIG. 13 is a diagram illustrating free curved surface coefficients for the head-up display device 30 according to the second embodiment.

The description below explains values such as an eye box size and a viewing angle in the eyepiece optical system according to the second embodiment in the order of the horizontal direction and the vertical direction.

TABLE 2

| | |
|---|---|
| Size of the eye box 8 | 130 × 40 mm |
| Effective size of image light in the liquid crystal display panel 2 | 67.4 × 30.1 mm |
| Viewing angle (total angle of view) | 10 × 4 degrees |
| Inclination | 0.7 degrees |
| Virtual image distance (L) | 16.5 m |
| Tilt of the virtual image plane against the inclination, 84 degrees | 84 degrees |

Dividing a focal length (−90 mm) of the concave lens by a focal length (188 mm) of the free curved surface concave mirror yields a value of −0.48.

Figure 14A:
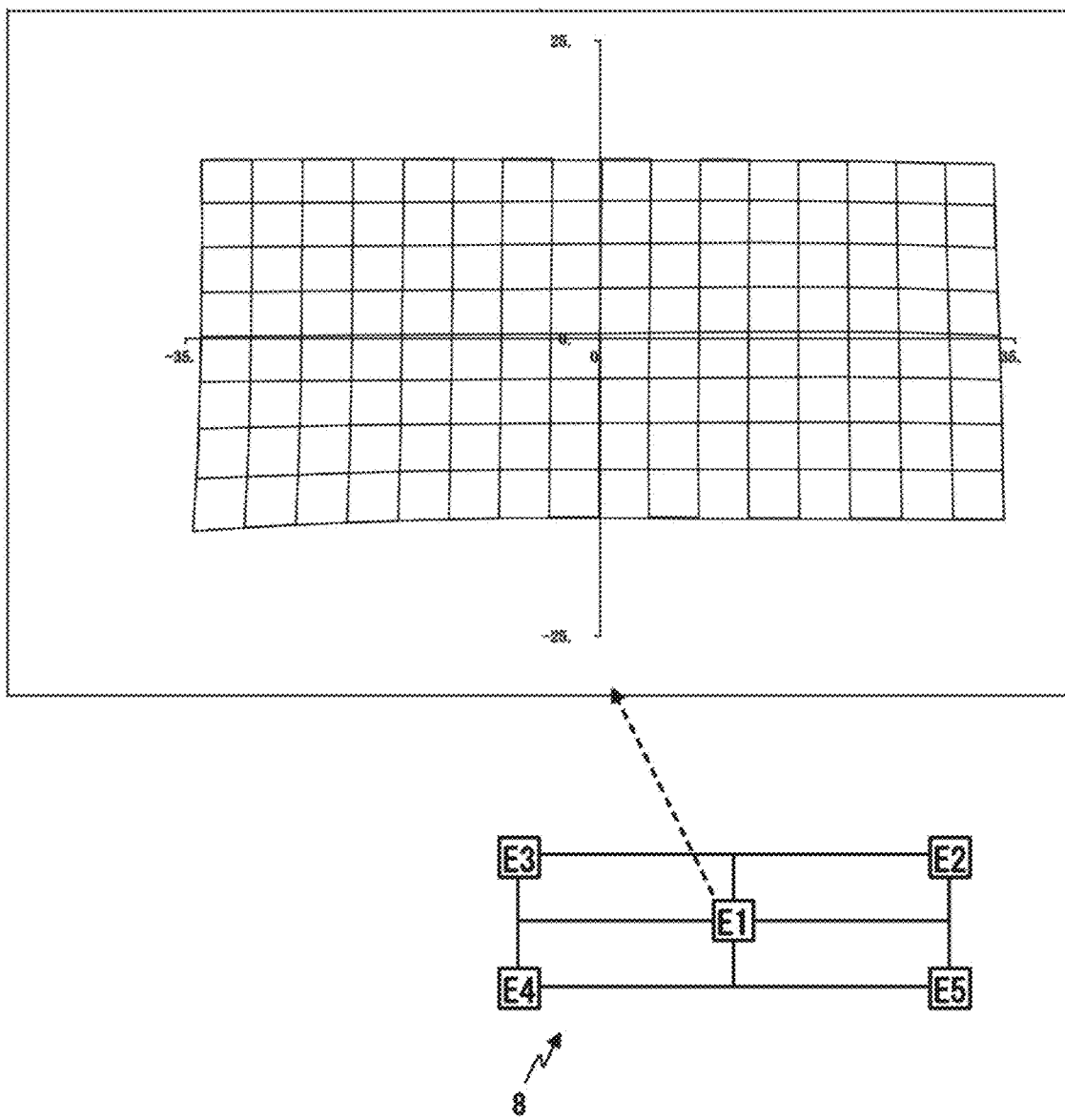
FIG. 14A is a diagram illustrating distortion performance viewed from the center of an eye box according to the second embodiment.
Figure 14B:
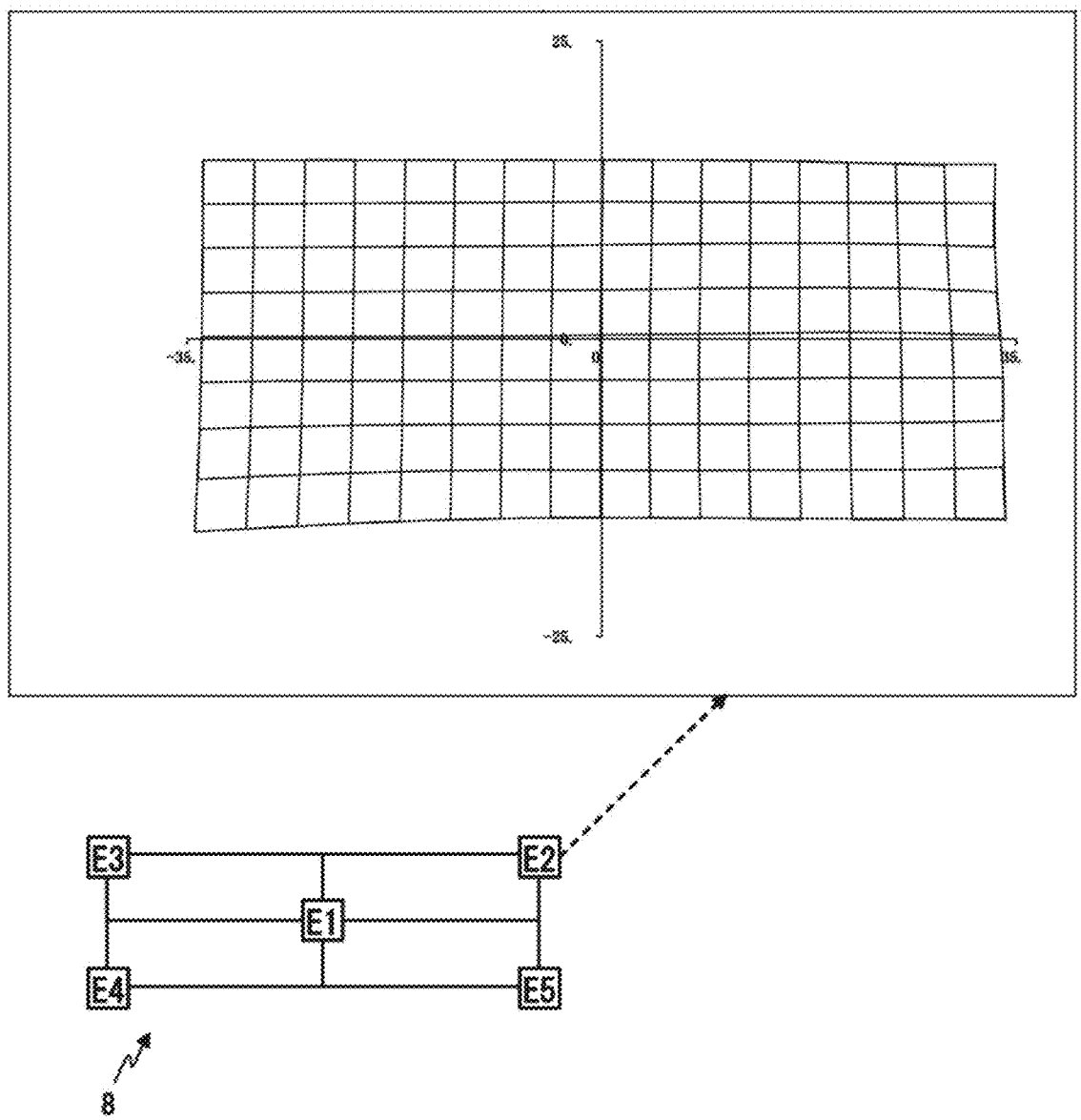
FIG. 14B is a diagram illustrating distortion performance viewed from the top right of the eye box according to the second embodiment.
Figure 14C:
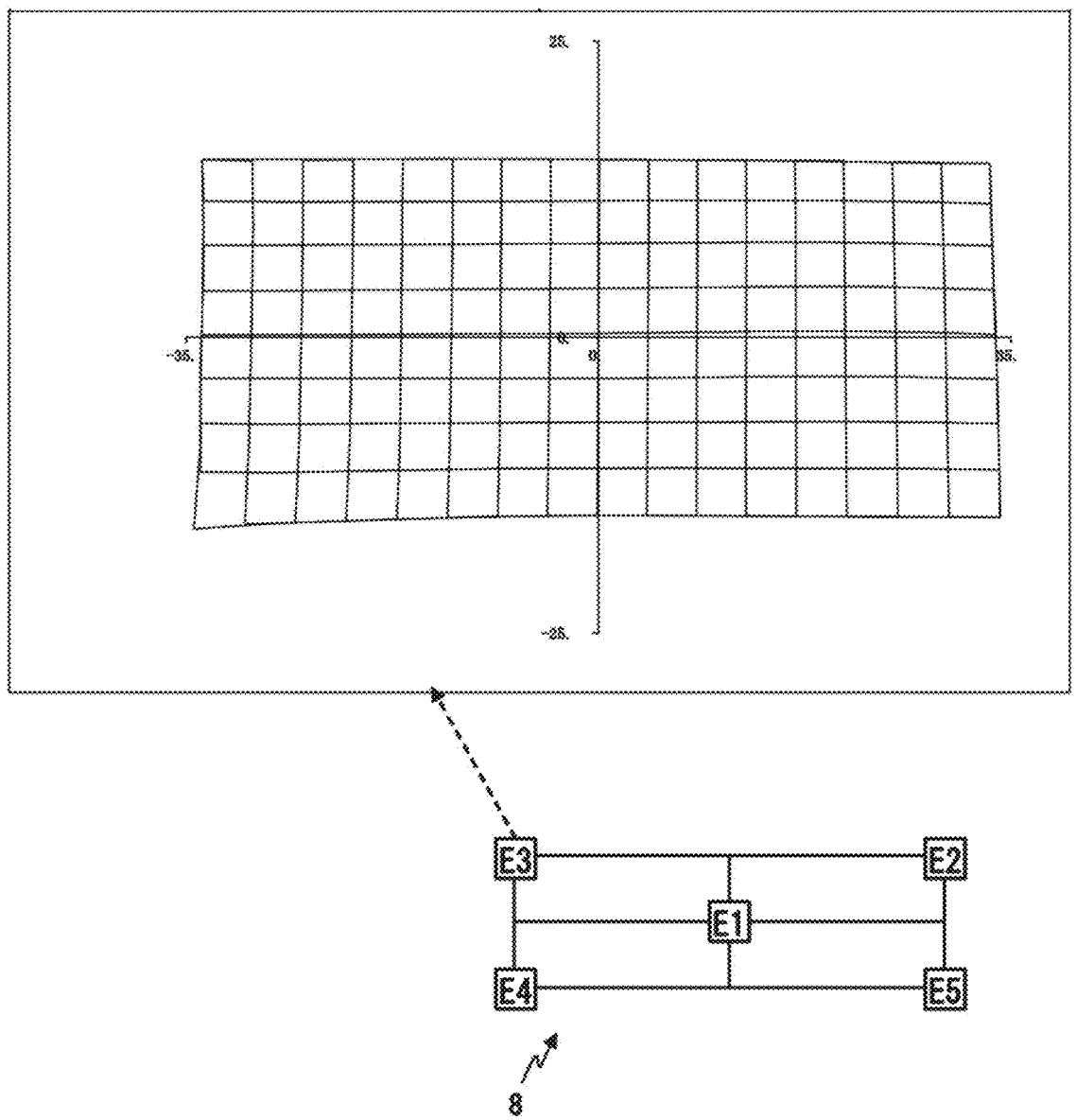
FIG. 14C is a diagram illustrating distortion performance viewed from the top left of the eye box according to the second embodiment.
Figure 14D:
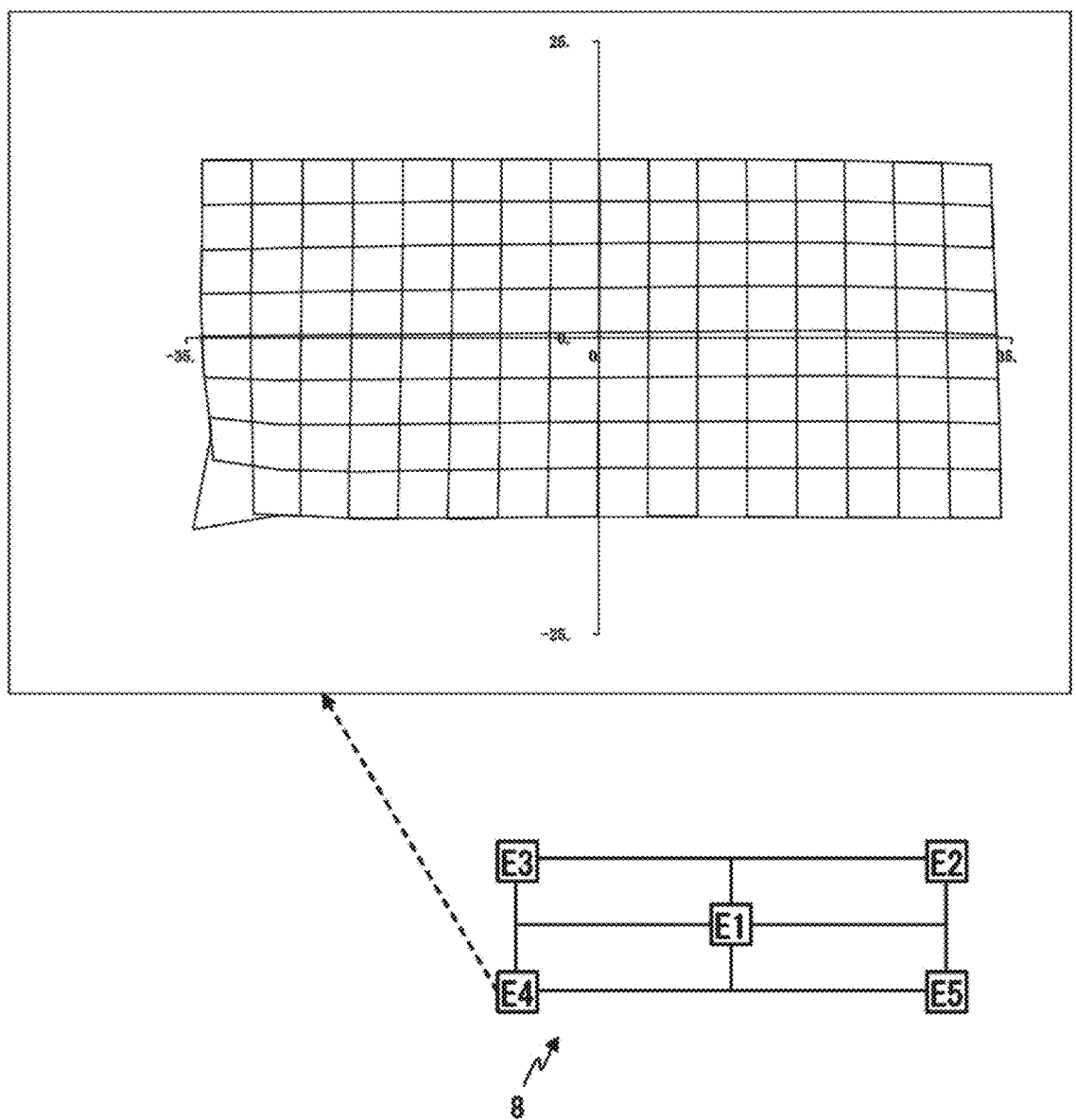
FIG. 14D is a diagram illustrating distortion performance viewed from the bottom left of the eye box according to the second embodiment.
Figure 14E:
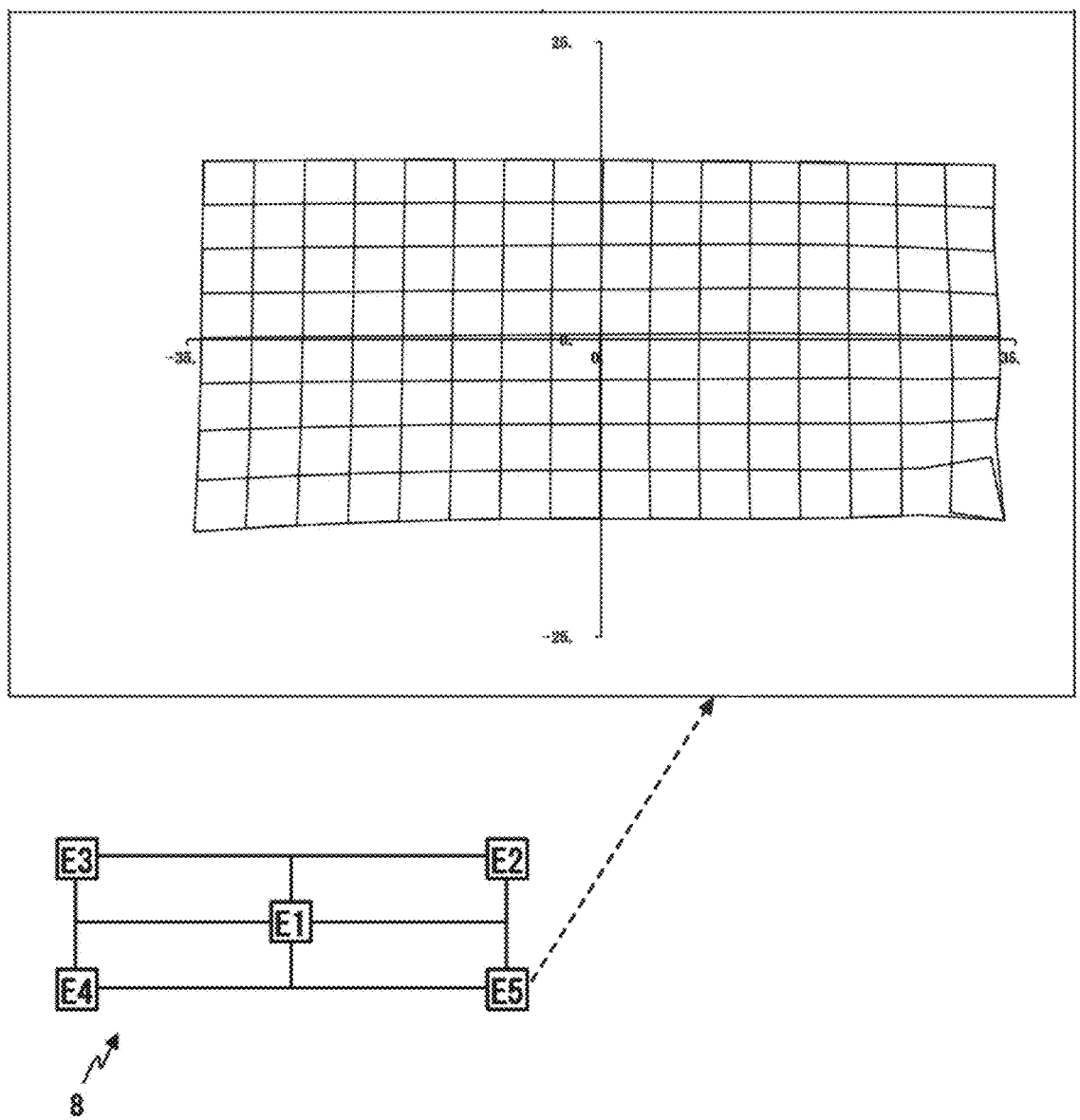
FIG. 14E is a diagram illustrating distortion performance viewed from the bottom right of the eye box according to the second embodiment.
Figure 15:
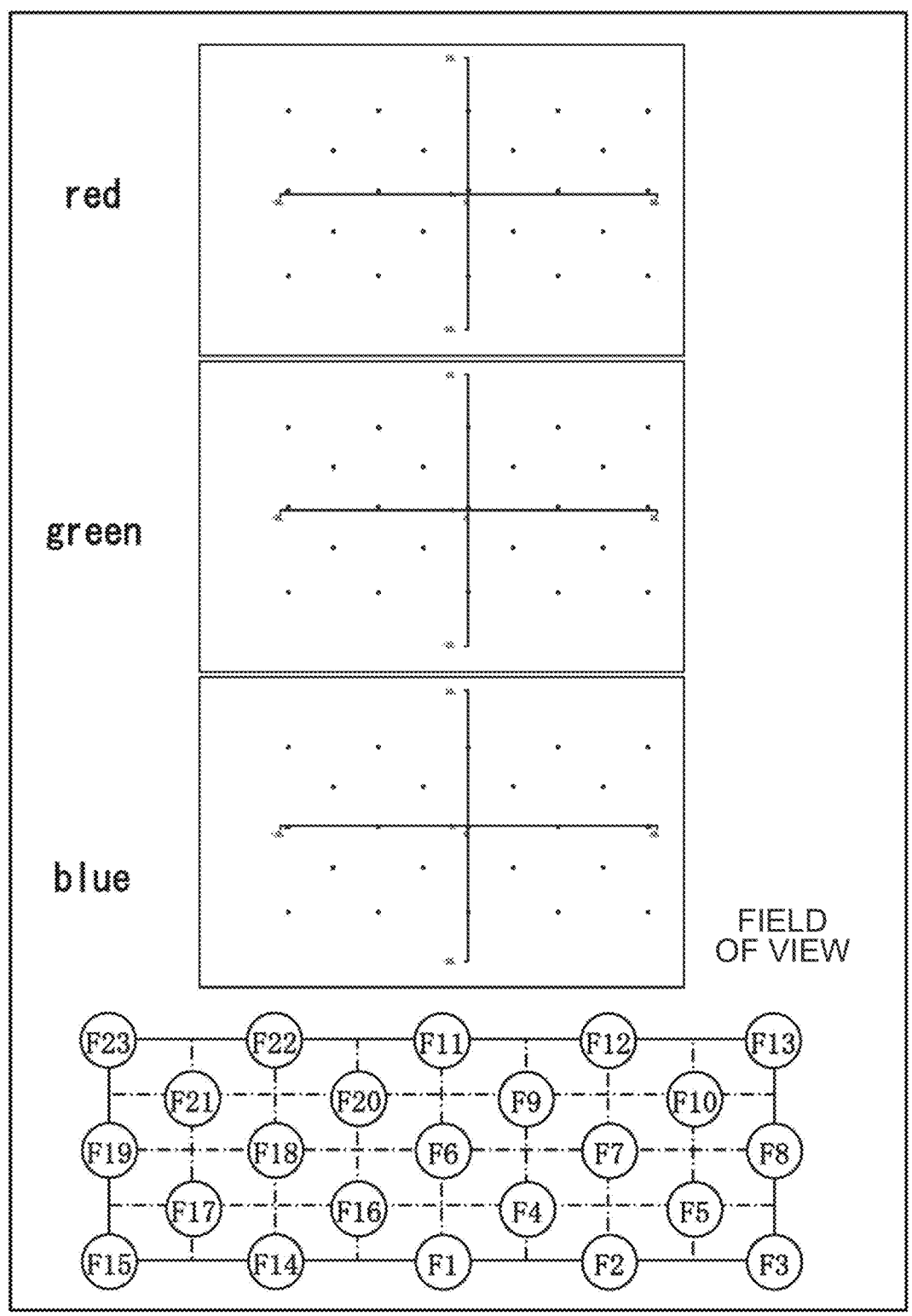
FIG. 15 is a spot diagram for the head-up display device according to the second embodiment.
Figure 16A:
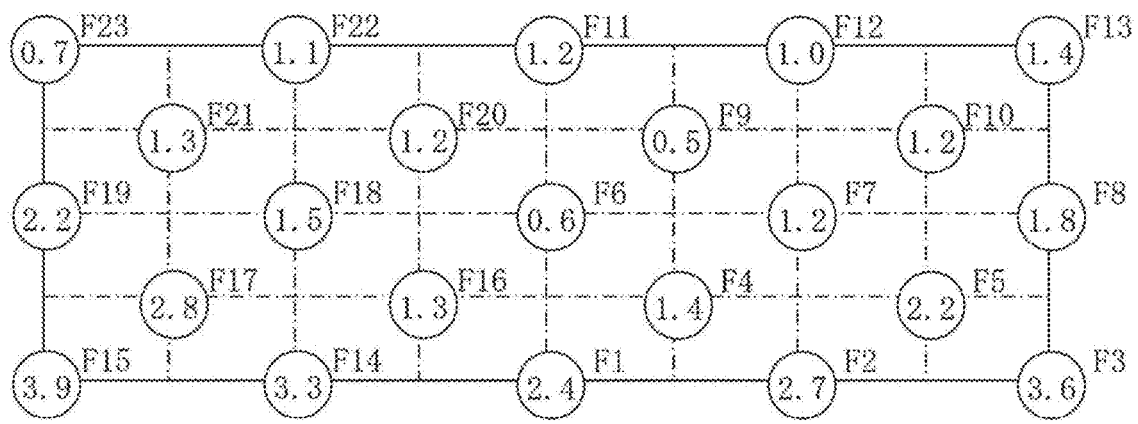
FIG. 16A is a diagram illustrating angle distortion of a principal ray according to the second embodiment.
Figure 16B:
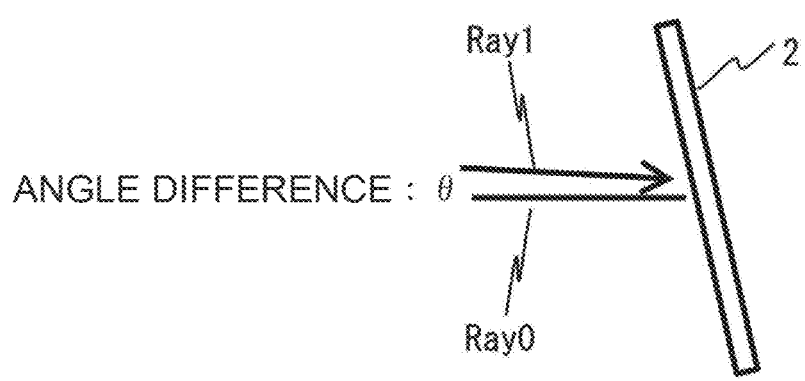
FIG. 16B is a diagram illustrating angle θ between the principal ray and a normal line of the liquid crystal display panel.

The description below explains the optical performance according to the second embodiment with reference to FIGS. 14A through 14E, 15, 16A, and 16B. FIGS. 14A through 14E illustrate the distortion performance of the head-up display device 30 according to the second embodiment. In more detail, FIG. 14A provides a distortion diagram at the liquid crystal display panel 2 based on a ray passing through the center of the eye box 8 within the rectangular virtual image range. FIGS. 14B, 14C, 14D, and 14E provide distortion diagrams at the liquid crystal display panel 2 based on rays passing through the corner points at the top right, the top left, the bottom left, and the bottom right of the eye box 8. FIG. 15 is a spot diagram for the head-up display device 30 according to the second embodiment. FIG. 16A is a diagram illustrating the deviation of an angle between principal ray Ray1 and virtual ray Ray0 at each angle of view. FIG. 16B is a diagram illustrating angle θ between the principal ray and the normal line of the liquid crystal display panel 2. As illustrated in FIG. 16A, virtual ray Ray0 corresponds to a straight line resulting from rotating the normal line of the liquid crystal display panel 2 by 13 degrees around the rotation axis parallel to the long side of the liquid crystal display panel 2. This signifies that an illumination optical system is tilted 13 degrees against the liquid crystal display panel 2. FIG. 16A shows that the angle deviation is small based on the maximum value of 3.9 degrees.

According to the present embodiment, the projection optical system uses the free curved surface concave mirror 54, the free curved surface lens 52, and the concave lens 51. The liquid crystal display panel 2 is tilted in a direction opposite to the Scheimpflug principle in the virtual image optical system. Therefore, it is possible to provide the head-up display device 30 that enables the virtual image plane 7 to tilt.

Third Embodiment

Figure 23:
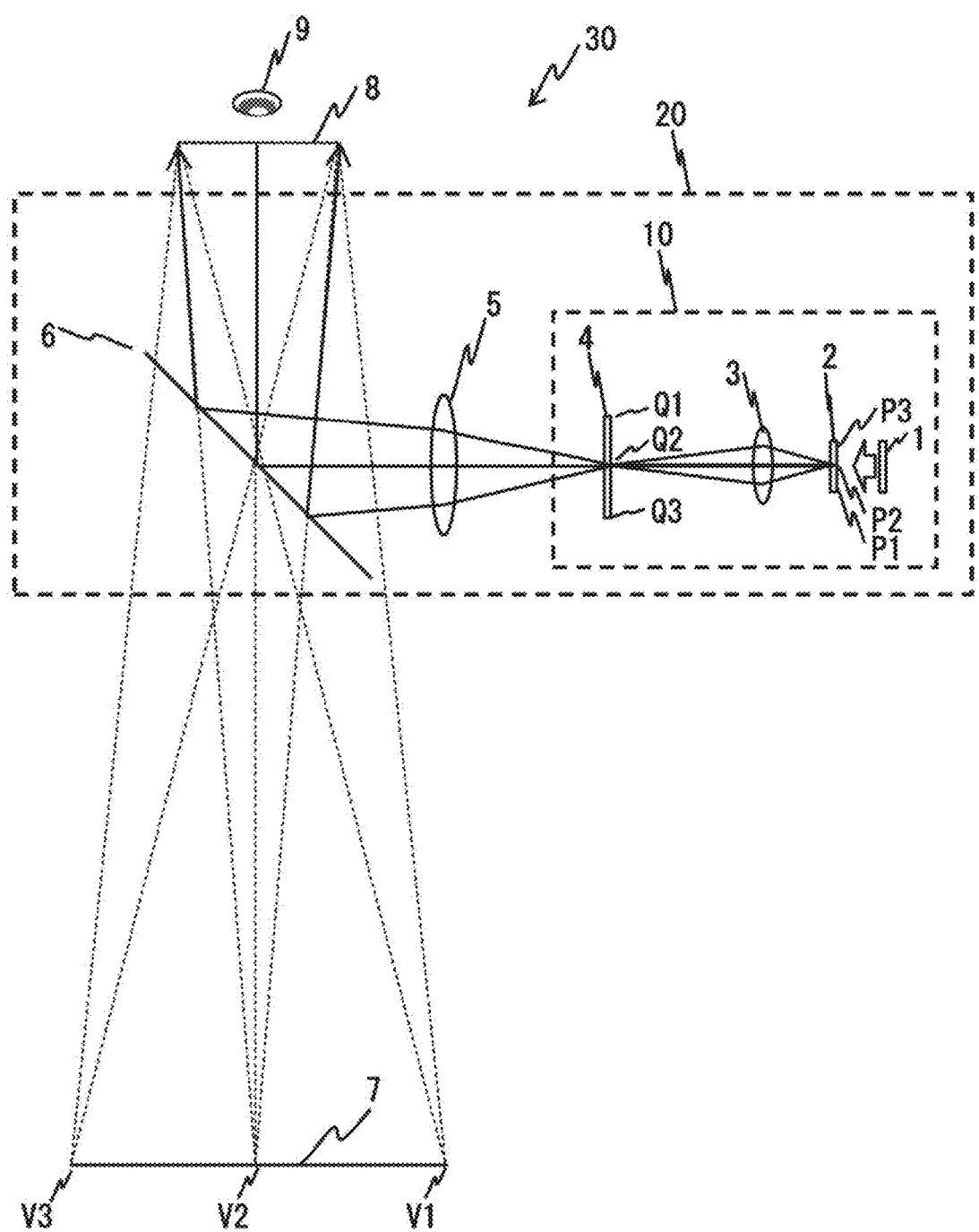
FIG. 23 is a schematic configuration diagram illustrating an image forming unit included in the head-up display device according to a third embodiment.

The second embodiment illustrated in FIG. 23 is characterized in that the configuration of the image forming unit 10 differs from the first and second embodiments. FIG. 23 is a schematic configuration diagram illustrating the image forming unit included in the head-up display device according to the third embodiment.

According to the first embodiment, the eyepiece optical system 5 directly enlarges the image information on the liquid crystal display panel 2 and displays a virtual image. Instead of this configuration of the image forming unit 10, a light valve is used as a light source. A relay optical system 3 enlarges and maps the image information on a screen plate (diffusion plate) by using the more small-sized liquid crystal display panel 2. The eyepiece optical system enlarges the image information and displays it as a virtual image.

In more detail, the backlight 1 radiates a light flux to the liquid crystal display panel 2. The light flux is assumed to be an image light flux containing the image information displayed on the liquid crystal display panel 2 and enters the relay optical system 3. The image information on the liquid crystal display panel 2 is enlarged due to an image formation action of the relay optical system 3 and is projected, while enlarged, to a screen plate (diffusion plate) 4. Points P1, P2, and P3 on the liquid crystal display panel 2 correspond to points Q1, Q2, and Q3 on the screen plate (diffusion plate) 4. A small-sized liquid crystal display panel can be used by using the relay optical system 3. The backlight 1, the liquid crystal display panel 2, the relay optical system 3, and the screen plate (diffusion plate) 4 form image information (image information) on the screen plate (diffusion plate) 4. These are generically called the image forming unit 10.

The screen plate (diffusion plate) 4 is comprised of a microlens array including two-dimensionally placed microlenses. This causes the diffusion to increase a spread angle of the light flux exiting from the screen plate 4 and ensure the specified size of the eye box 8. Further, the diffusion of the screen plate (diffusion plate) 4 can be achieved also by incorporating diffusion particles.

Fourth Embodiment

Figure 24:
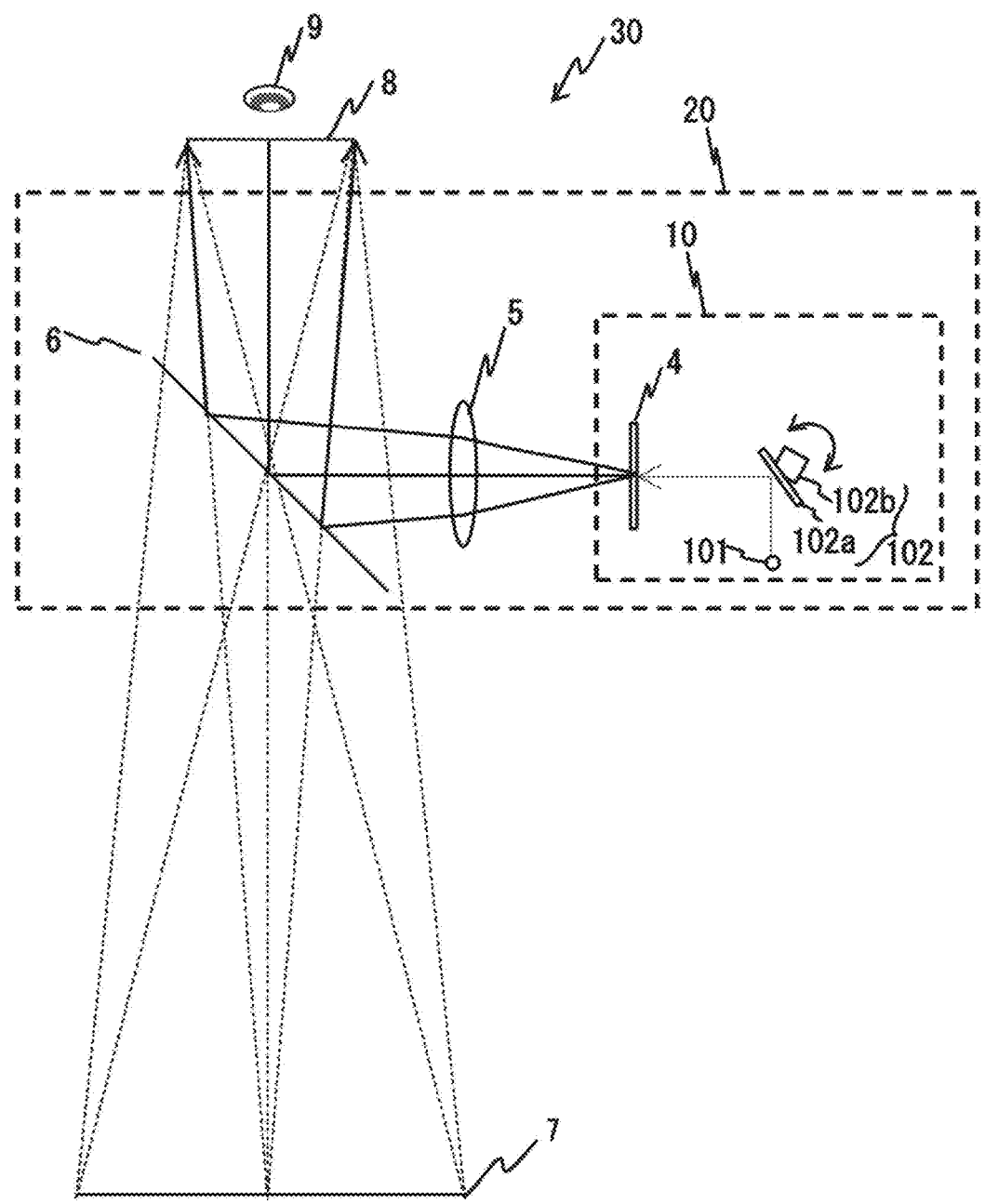
FIG. 24 is a schematic configuration diagram illustrating an image forming unit included in the head-up display device according to a fourth embodiment.

The fourth embodiment is characterized in that the configuration of the image forming unit 10 differs from the first and second embodiments. The description below explains the fourth embodiment with reference to FIG. 24. FIG. 24 is a schematic configuration diagram illustrating the image forming unit included in the head-up display device according to the fourth embodiment.

The first embodiment maps image information of the liquid crystal display panel 2 to the screen plate 4 having the diffusion capability. This configuration of the image forming unit 10 may be replaced by optically scanning a laser light source and thereby forming an optical scanning image on the screen plate 4 having the diffusion capability. The image forming unit 10 according to the fourth embodiment may use a micro-electro-mechanical system (MEMS) as an optical scanner. In the MEMS, a reflection plane is rotated to vary a ray angle. An optical scanning position is thereby adjusted to the exit pupil position. The rotation center of the reflection plane in a MEMS 102 is aligned to a position assumed in the eyepiece optical system 5.

REFERENCE SIGNS LIST

- 1 . . . backlight
- 2 . . . liquid crystal display panel
- 3 . . . relay optical system
- 4 . . . screen plate (diffusion plate)
- 5 . . . eyepiece optical system
- 6 . . . windshield
- 7 . . . virtual image plane
- 8 . . . eye box
- 9 . . . eye
- 10 . . . image forming unit
- 20 . . . projection optical system
- 30 . . . head-up display device
- 51 . . . concave lens
- 52 . . . free curved surface lens
- 53 . . . reflecting mirror
- 54 . . . free curved surface concave mirror
- 101 . . . convex lens
- 111 . . . object surface
- 112 . . . real image surface
- F . . . focus position

The invention claimed is:

1. A projection optical system including an eyepiece optical system that generates image information and displays a virtual image by reflecting image light emitted from an image forming unit that emits the image light including the image information;

wherein the eyepiece optical system includes a free curved surface lens and a free curved surface concave mirror in order from the image forming unit side along an emission direction of the image light, and when a virtual image plane is tilted to display a virtual image in a range from a far distance to a near distance, a point on the image forming unit conjugating to a far point on the virtual image plane is optically farther from a light flux entering the image forming unit than a point on the image forming unit conjugating to a near point on the virtual image plane.

2. The projection optical system according to claim 1, wherein a concave lens is placed between the image forming unit and the free curved surface lens.

3. A head-up display device including an image forming unit that emits image light containing image information and an eyepiece optical system that displays a virtual image by reflecting the image light;

wherein the eyepiece optical system includes a free curved surface lens and a free curved surface concave mirror in order from the image forming unit side along an emission direction of the image light, and when a virtual image plane is tilted to display a virtual image in a range from a far distance to a near distance, a point on the image forming unit conjugating to a far point on the virtual image plane is optically farther from a light flux entering the image forming unit than a point on the image forming unit conjugating to a near point on the virtual image plane.

4. The head-up display device according to claim 3, wherein a concave lens is placed between the image forming unit and the free curved surface lens.

5. The head-up display device according to claim 3, wherein the image forming unit includes a backlight and a liquid crystal display panel.

6. The head-up display device according to claim 3, wherein the image forming unit includes a relay optical system to form a light valve image and a screen plate having a diffusion capability.

7. The head-up display device according to claim 3, wherein the image forming unit includes a laser light source, an optical scanner to optically scan the laser light source by rotating a reflection plane, and a screen plate having a diffusion capability.

* * * * *